(12) United States Patent
Watanabe et al.

(10) Patent No.: US 8,068,500 B2
(45) Date of Patent: Nov. 29, 2011

(54) NODE DEVICE, PACKET CONTROL DEVICE, RADIO COMMUNICATION DEVICE, AND TRANSMISSION CONTROL METHOD

(75) Inventors: Koji Watanabe, Kokubunji (JP); Yousuke Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 582 days.

(21) Appl. No.: 11/658,594

(22) PCT Filed: Jul. 28, 2005

(86) PCT No.: PCT/JP2005/013855
§ 371 (c)(1),
(2), (4) Date: Jan. 26, 2007

(87) PCT Pub. No.: WO2006/033201
PCT Pub. Date: Mar. 30, 2006

(65) Prior Publication Data
US 2009/0003383 A1    Jan. 1, 2009

(30) Foreign Application Priority Data
Sep. 21, 2004  (JP) ................................. 2004-272687

(51) Int. Cl.
*H04L 12/56* (2006.01)
(52) U.S. Cl. ..................... 370/395.52; 370/349; 370/466
(58) Field of Classification Search .................. None
See application file for complete search history.

(56) References Cited

U.S. PATENT DOCUMENTS

| | | | |
|---|---|---|---|
| 6,493,342 B1 * | 12/2002 | Breslow et al. | 370/394 |
| 6,597,675 B1 * | 7/2003 | Esmailzadeh et al. | 370/335 |
| 6,963,751 B1 | 11/2005 | Kordsmeyer et al. | |
| 7,142,512 B1 * | 11/2006 | Kobayashi et al. | 370/232 |
| 7,505,431 B2 * | 3/2009 | Chitrapu et al. | 370/331 |
| 2001/0053149 A1 * | 12/2001 | Mo et al. | 370/389 |
| 2002/0105969 A1 * | 8/2002 | Benedyk et al. | 370/466 |
| 2002/0126675 A1 * | 9/2002 | Yoshimura et al. | 370/395.21 |
| 2003/0036361 A1 | 2/2003 | Kawai | |

(Continued)

FOREIGN PATENT DOCUMENTS
CN   1471253 A   1/2004
(Continued)

OTHER PUBLICATIONS

3GPP2 S. P0038-0 version 1.1.8, Draft, Sep. 17, 2003.

(Continued)

*Primary Examiner* — Huy Vu
*Assistant Examiner* — James P Duffy
(74) *Attorney, Agent, or Firm* — Mattingly & Malur, PC

(57) ABSTRACT

A conventional node 3 divides an IP packet into data fragments and prepares a packet for RAN 9 transmission. There has been a problem that, since a RAN 6 cannot identify an IP packet unit, affinity is low relative to an IP network 1 that serves as a core. A node 3 prepares A10 packets by dividing an IP packet, and adds, to each A10 packet, a concatenation flag that indicates information stored in the A10 packet is the head or the tail of the IP packet. A base station 5 and a packet control device 4 employ the concatenation flag to control transmission for each IP packet unit. For example, a packet control device 4 employs a concatenation flag to discard information for a series of A10 packets received by the node, including information that constitutes the same IP packet.

10 Claims, 22 Drawing Sheets

U.S. PATENT DOCUMENTS

| | | |
|---|---|---|
| 2003/0120802 A1 | 6/2003 | Kohno |
| 2004/0009773 A1 | 1/2004 | Kato |
| 2004/0071140 A1* | 4/2004 | Jason et al. ................... 370/392 |
| 2004/0156377 A1* | 8/2004 | Walls et al. ................... 370/412 |
| 2004/0196786 A1* | 10/2004 | Laha et al. ................... 370/229 |
| 2005/0281288 A1* | 12/2005 | Banerjee et al. ............. 370/477 |

FOREIGN PATENT DOCUMENTS

| | | |
|---|---|---|
| DE | 198 20 233 A1 | 11/1999 |
| EP | 1 162 766 A1 | 12/2001 |
| EP | 1 180 878 A2 | 2/2002 |
| JP | 2001-94562 | 4/2001 |
| JP | 2003-169040 A | 6/2003 |
| WO | WO 01/48952 A1 | 7/2001 |

OTHER PUBLICATIONS

NTT Docomo Technical Journal, vol. 5, No. 2.

3GPP2 S. P0079-0 version 0.05.5, Jun. 11, 2003.

Transport QoS in the Radio Access Network (RAN).

A Proportionally Fair Scheduling Algorithm with QoS and Priority in 1XEV-DO, Kuenyoung Kim, Hoon Kim, Youngnam Han.

Cdma2000 1x Musen Link Protocol-jo no TCP Tsushin no Kaiseki to Seino Hyoka, IEICE Technical Report NS2002-180, Nov. 15, 2002, pp. 37-42.

Oda et al, "Mobile Internet no Yoso Gijutsu 2.1 Ido I sushinmo no All IP-ka", Joho Shori, vol. 42, No. 12, Dec. 15, 2001, pp. 1198-1203.

* cited by examiner

NODE DEVICE, PACKET CONTROL DEVICE, RADIO COMMUNICATION DEVICE, AND TRANSMISSION CONTROL METHOD

TECHNICAL FIELD

The present invention relates to a packet communication system to be connected to an IP network.

BACKGROUND ART

Recently, applications and traffic related to IP (Internet Protocol) have increased, and a high affinity with IP has been requested for mobile communication networks. The trend to introduce IP techniques into mobile communication networks is called the ALL IP trend, which is a subject discussed by various standardization organizations. For example, 3GPP2 ($3^{rd}$ Generation Partnership Project 2) is discussing phased developments relative to the ALL IP trend for a cdma 2000 network (3GPP2 S.P0038-0 Version 1.1.8 Draft, Sep. 17, 2003 (non-patent document 1)).

As broadband access of the Internet has spread, the use of multimedia communication, such as data communication, VoIP and animation email, has come to be widely employed. The quality of a transfer delay, a transfer delay fluctuation, an information error, etc., that is required for multimedia communication varies, depending on the individual media. And the need that quality of service (QoS) be appropriately controlled for individual media has increased.

As a general QoS control method for the Internet, there is Diffserv, which has been standardized by IETF. According to Diffserv, a TOS (Type of Service) field is re-defined in an IP header, and a packet forwarding operation is performed by using the value of a DSCP (Diffserv Code Point) in the TOS field. A packet forwarding operation designated using a DSCP is called a PHB (Per-Hop Behavior).

There are roughly three Diffserv classes: EF (Expedited Forwarding) is the highest priority class, AF (Assured Forwarding) is the intermediate class, and Default is the best effort class. AF is divided into four other classes, in accordance with priority levels of transmission, and each of these classes is divided into three more levels, in accordance with priority levels for packet abandonment. Using Diffserve, packet transfer control is performed based on a DSCP, which is control information included in a packet. This is a scalable method based on a network scale (a number of relay nodes), and is widespread.

QoS control is also discussed for a mobile communication network.

For example, a study of QoS control for a fourth generation mobile communication system is reported in NTT DoCoMo Technical Journal Vol. 5, No. 2, pp. 41-46, September 2003 (non-patent document 2).

The cited reference discloses an architecture wherein control is performed by mapping, to a QoS class at an IP lower rank, an IP packet that belongs, for example, to the EF or AF class, or a characteristic use where QoS for the IP layer is linked to QoS for wireless. However, for a radio transfer, commonly, an IP packet is divided or a radio transfer packet is formed on a RAN (Radio Access Network) or at a radio base station, and generally, a one-to-one correspondence is not established between an IP packet and a packet at a lower IP layer. In the cited reference, QoS control performed when an information unit differs for each layer, because of the division of a packet, is not specifically disclosed.

Further, for 3GPP2, for example, performance of QoS control between end points, an MS (Mobile station) and a CN (Correspondent Node), has been discussed (3GPP2 S.P0079-0 Version 0.0 5.5, Jun. 11, 2003 (non-patent document 3)). A typical system configuration for 3GPP2 is shown in FIG. 1. Reference numeral 8 or 340 denotes an MS (Mobile station), and 7 denotes a CN (Correspondent Node). Further, reference numeral 1 denotes an IP network; 2 and 6, border routers; 3, a node device PDSN (Packet Data Service Node); 4, a packet control device BSC/PCF (Base Station Controller/Packet Control Function); 5, an AP (Access Point); and 9, a RAN (Radio Access Network). When QoS control for an IP layer is to be performed between end points, it is requested by the PDSN and the MS that a service provided by a layer lower than the IP should have high affinity relative to a service provided by an IP layer.

An explanation will be given for example conventional IP packet transfer control performed on a 3GPP2 mobile communication network. Assume that, for a network shown in FIG. 1, an IP packet is transmitted from BR 2 to PDSN 3. An example for the transmission of information from PDSN 3 to MS 8 is shown in FIG. 2. An IP packet 10 received by PDSN 3 is mapped into different connections 11 and 12, in accordance, for example, with a QoS class indicated in control information for a header, and is transmitted to PCF 4. The connections 11 and 12 from PDSN 3 to PCF 4 are connections for an A10 interface, and the PDSN prepares an A10 packet based on the IP packet and transmits the A10 packet to the PCF. Connections 13 and 14 from the PCF 4 to an AP 5 are connections for an A8 interface, and the PCF 4 prepares an A8 packet based on the A10 packet, and transmits the A8 packet to the AP 5. A scheduler 115 for the AP 5 controls the transmission of the received A8 packet to a wireless medium, in accordance with a priority level consonant with the connection 13 or 14.

For example, suppose that the connection 14 is the Best effort class and the connection 13 is the high priority class. The scheduler 115 provides transmission control for the A8 packet to the connection 13 prior to the A8 packet to the connection 14. When RLP (radio Link Protocol) is employed, the AP 5 generates RLP packets 15 and 16 from the A8 packet, in accordance with the RLP, and transmits to a wireless medium a signal generated at an RLP lower layer. The MS 8 includes: an AT (Access Terminal) 18, which has a radio transmission/reception function; and a TE (Terminal) 19, which executes an application. The AT 18 demodulates information based on received signals 15 and 16, reconfigures an IP packet 17 and transmits it to the TE 19. The network configuration in FIG. 1 is merely an example, and PDSN 3 and PCF 4, for example, may be mounted in a single case. Further, BSC and PCF, for example, may be mounted in different cases. A10 and A8 are protocols employed for communication between the PDSN and the PCF and between the PCF and the AP.

An example format for the A10 packet prepared by the PDSN 3 is shown in FIG. 3. Assume that the PDSN 3 receives an IP packet 20. When PPP (Point to Point Protocol) is employed by the PDSN 3 and the MS 8, the PDSN 3 configures a PPP packet 21 by adding PPP control information to the packet 20. Further, the PDSN 3 forms a frame 22 by adding control information 7E to the PPP packet in accordance with a framing protocol that is employed based on the PPP. The PDSN 3 divides the frame 22 into maximum transfer units (MTUs) 26 and 30. As control information, IP headers 24 and 28 and GRE (Generic Routing Encapsulation) headers 25 and 29 are respectively added to the obtained data 26 and 30 to form A10 packets 23 and 27. The PDSN 3 transmits the A10 packets 23 and 27 to the PCF 4.

An example format for the A8 packet prepared by the PCF 4 is shown in FIG. 4. Assume that the PCF 4 receives the A10 packet 23. The PCF 4 divides data 26 into data 35 and data 36, in accordance with an information transfer unit such as ECB, created by the AP 5. In this case, the ECB (Error Control Block) is an RS (Reed Solomon) coding unit for error control. As control information, the PCF 4 adds IP headers 38 and 42 and GRE headers 39 and 43, respectively, to the obtained data 35 and 36, and forms A8 packets 37 and 41. The PCF 4 transmits the A8 packets 37 and 41 to the AP 5.

An example format for an ECB that is prepared as a radio transmission unit by the AP 5 is shown in FIG. 5. Assume that the AP 5 receives the A8 packet 37. In accordance with control information included in the GRE header 37, the AP 5 stores the data 35 in an ECB 55. The scheduler 115 of the AP 5 employs a priority level consonant with the A8 packet 37 for storage of the data 35 in the ECB 55. The priority level is determined by employing a DSCP included in an IP header. The AP 5 calculates an error correction parity 57, by employing the stored information, and stores it in the ECB 55.

Another example format for a radio transmission unit prepared by the AP 5 is shown in FIG. 6. Assume that the AP 5 receives the A8 packet 37. The scheduler 115 of the AP 5 employs a priority level consonant with the A8 packet 37 for the formation of an RLP packet from the A8 packet 37. The AP 5 prepares an RLP packet 120 by adding an RLP header to the data 35 of the A8 packet 37. The AP 5 adds control information (Stream Layer Header) to the RLP packet 120, and creates a stream layer packet 121. The AP 5 adds control information (Session Layer Header) to the stream layer packet 121, and prepares a session layer packet 122. The AP 5 adds control information (Connection Layer Header) to the session layer packet 122, and creates a connection layer packet 123. The AP 5 adds, to the connection layer packet 123, control information (Encryption Protocol Header/Trailer, Authentication Protocol Header/Trailer and Security Protocol Header/Trailer), and prepares a security layer packet 125. The AP 5 adds control information (MAC layer Trailer) to the security layer packet 125, creates a MAC layer packet 126, and transmits it.

In "Transport QoS in the Radio Access Network (RAN)", A20-20020107-016, (January, 2002), a written contribution by 3GPP2 (non-patent document 4), performance of the QoS control for the RAN using Diffserv is disclosed. According to the disclosure of the cited reference, for IP capsulation, the PDSN maps the DSCP of an IP header to be capsulated into the DSCP of an IP header (outer IP header) to be obtained by capsulation. For example, while referring to FIG. 3, the PDSN 3 copies the DSCP of the IP header 50 for the IP packet 20 to the IP headers 24 and 28 of the A10 packet. Further, in FIG. 3, for example, the PDSN 3 adds, to the IP headers 28 and 28 of the A10 packet, the DSCP that is consonant with the DSCP of the IP header 50 of the IP packet 20. And the PCF 4 prepares the A8 packet based on the received A10 packet. At this time, the PCF 4 copies, unchanged, the DSCP of the outer IP header of the A10 packet to the DSCP of the outer IP header of the A8 packet.

In "A PROPORTIONALLY FAIR SCHEDULING ALGORITHM WITH QOS AND PRIORITY IN 1XEV-DO", Kuenyoung Kim, Hoon Kim and Youngnam Han, Proceedings PIMRC2002, Lisbon, September, 2002, p. 2239 (non-patent document 5), a scheduling algorithm for an AP in conventional 1xEvDO is disclosed. According to this reference, the AP performs scheduling by using an algorithm called proportional fairness. Proportional fairness is an algorithm by which the throughput of a system is increased to the maximum and transmission periods are fairly allocated to mobile stations. An overview will now be explained. Mobile stations measure C/Is, and request from an AP the highest transmission rates that can be determined to be attained. At this time, the C/I is a ratio of signal power to interference power. The mobile stations request from the AP transmission rates for each period of time, called a slot. Assume that the transmission rate requested by the mobile station is a DRC. The AP calculates an average value R for the transmission rates actually allocated to the mobile stations, and further, calculates DRC/R. The AP allocates a transmission period to the mobile station for which the DRC/R is the maximum.

Example scheduling performed by the system in FIG. 1 is shown in FIG. 28. In FIG. 28, the horizontal axis represents time, and the vertical axis represents a DRC/R value. The DCR/R values for the MS 8 and the MS 340 fluctuate, depending on changes in the transmission environment. During a period 601, the DRC/R of the MS 8 is greater than the DRC/R of the MS 340. The AP 5 allocates the period 601 as a period for a transmission to the MS 8. During a period 602, the DRC/R of the MS 340 is greater than the DRC/R of the MS 8. The AP 5 allocates the period 602 as a period for a transmission to the MS 340. During a period 603, the DRC/R of the MS 8 is greater than the DRC/R of the MS 340. The AP 5 allocates the period 603 as a period for a transmission to the MS 8. During a period 604, the DRC/R of the MS 340 is greater than the DRC/R of the MS 8. The AP 5 allocates the period 604 as a period for a transmission to the MS 340. In non-patent document 5, an example wherein weighting is performed using k and scheduling is performed using a value of k*(DRC/R) is disclosed. It is mentioned that k is obtained as a result of a delay or a data rate; however, a specific method is not disclosed.

DISCLOSURE OF THE INVENTION

Problems to be Solved by the Invention

According to the conventional method, the PDSN or the PCF divides an IP packet into data fragments and prepares a packet for RAN transmission. Since the RAN can not identify a break between IP packet units, the following problems, as explained, occur.

In the RAN, the QoS control is performed without considering an IP packet unit. Thus, affinity with the QoS of an IP packet is not high. For example, since an A8/A10 packet is prepared by dividing an IP packet and is transmitted without taking into account a cluster of IP packet information, a useless data transmission or a delay or a jitter, in an IP packet, occurs. FIG. 7 shows an example IP packet process performed when an IP packet is divided into data fragments at the time of transmission for the IP packet. Since the packet length for the RAN protocol and the IP protocol does not always match, a situation during which one fragment 62 of an IP packet 60 is abandoned, for example, occurs. In this case, when data fragments 63 and 64 are received by a reception side, the IP packet 60 can not be reproduced, and transmission of the data fragments 63 and 64 is useless. Further, assume, for example, that one fragment 64 of the IP packet was not stored when the AP 5 prepared a radio transmission unit (ECB 67). When the AP 5 transmits a radio transmission unit from which the fragment 64 is omitted, the MS 8 on the reception side waits until all the data constituting the IP packet is completed. Thus, a situation wherein the overall transmission of the IP packet 60 is delayed occurs.

Furthermore, when delay or jitter control is performed at the A8/A10 packet level, this may not result in a QoS improvement for an IP packet. Viewed from the entire network, it is over-spaced and useless for QoS control to be performed for the IP layer, by the PDSN/RAN, as strictly as, or more strictly than guaranteed. For example, when the PCF 4 performs jitter control, and maintains time intervals 74, 75, 76 and 77 between data fragments obtained by dividing an IP packet, a useless transmission still occurs because IP packets 60 and 61 are formed after all the data for an IP packet unit is completed at the MS 8 on the reception side.

Furthermore, when a plurality of A8 connections correspond to an RLP (Radio Link Protocol), data for the multiple A8 connections are packed into one radio transmission unit (RLP packet), and the packet is transmitted by radio. At this time, there is a problem, in that if information obtained by dividing a plurality of IP packets is transmitted as nested information, the MS that receives an RLP packet can not recover the IP packets. For example, FIG. 26 shows an example packet format when the RAN transmits IP packets to the MS. Assume that data fragments 352 and 353 obtained by dividing an IP packet 350 are input to connection #1 of the AP, and data fragments 354 and 355 obtained by dividing an IP packet 351 are input to connection #2 of the AP. Without taking into account the cluster of the IP packets, the AP packs, in an RLP packet 356, the data fragment 352 of the IP packet 350, the data fragment 354 of the IP packet 351, the data fragment 353 of the IP packet 350 and the data fragment 355 of the IP packet 351, in the named order, and transmits the RLP packet 356. The MS that receives this RLP packet 356 does not identify the boundaries of the data fragments, and can not separate the IP packets 350 and 351.

The PDSN prepares a RAN transmission packet based on an IP packet. There is a case wherein the PDSN divides an IP packet, and there is a probability that the transmission unit used for the RAN differs from the transmission unit (IP packet) used for a core network. Since transmission control without being aware of an IP packet is performed in the RAN, a useless transmission may occur. One objective of the present invention is to reduce useless transmission events due to a difference in the transmission protocols for a RAN and for a core network.

Means for Solving the Problems

A node (PDSN) according to the present invention prepares an A10 packet by dividing an IP packet, and adds an A10 concatenation flag to the A10 packet. The A10 concatenation flag represents an A10 packet that includes a data fragment corresponding to the head of an IP packet, and an A10 packet that includes a data fragment corresponding to the tail of the IP packet. Further, according to a communication protocol, the PDSN of this invention prepares a frame that includes the entire IP packet, creates an A10 packet by dividing the frame, and adds an A10 concatenation flag to the A10 packet.

Furthermore, the PDSN of the invention includes: a timer, for counting time; and a controller, for checking the time of reception for an IP packet and for dividing the IP packet and creating an A10 packet. The controller of the PDSN forms a frame that includes an IP packet received according to a protocol, and divides the frame to create an A10 packet. For transmission, the PDSN of this invention adds reception time for the IP packet as control information for the A10 packet.

A packet control apparatus (PCF) according to this invention comprises a controller for receiving an A10 packet and preparing an A8 packet, and adds an A8 concatenation flag as control information for the A8 packet. The A8 concatenation flag represents an A8 packet that includes a data fragment corresponding to the head of an IP packet received by the PDSN, and an A8 packet that includes a data fragment corresponding to the tail of the IP packet.

The PCF of this invention comprises the controller for receiving an A10 packet and preparing an A8 packet, and adds, as control information for the A8 packet, time for the reception of an IP packet at the PDSN.

The PCF of the invention employs the A10 concatenation flag and collectively abandons information (data and additional information, such as a header), in the A10 packet, that include information constituting the same IP packet or frame received by the PDSN.

In addition, the PCF of the invention employs the A10 concatenation flag and the service quality type for the IP packet received by the PDSN, and collectively abandons information in the A10 packet (data and additional information, such as a header) that includes information constituting the same IP packet or frame received by the PDSN.

A base station (AP) according to the invention employs an A8 concatenation flag, and abandons information, in an A8 packet, that includes information constituting the same IP packet or frame received by the PDSN.

Furthermore, the AP of this invention employs the A8 concatenation flag and the service quality type of the IP packet received by the PDSN, and collectively abandons information in the A8 packet (data and additional information, such as a header) that includes information constituting the same IP packet or frame received by the PDSN.

Further, the AP of this invention includes a controller, for creating a radio transmission unit based on a plurality of IP packets received by the PDSN, or a plurality of frames prepared by the PDSN. The controller employs the A8 concatenation flag, and sequentially stores, in each radio transmission unit, information from the head to the tail of the same IP packet or frame.

Moreover, according to the invention, when a predetermined period of time has elapsed since the AP received an A8 packet that included a data fragment corresponding to the head of an IP packet received by the PDSN, and when the AP has not yet received an A8 packet that includes a data fragment corresponding to the tail of the IP packet, the AP employs the A8 concatenation flag and the reception time and collectively abandons information in the A8 packet, including information constituting the same IP packet or frame.

Further, the AP of the invention includes: a timer, for counting time; and a controller, for preparing a radio transmission unit based on a received A8 packet. The controller employs an A8 concatenation flag to form a radio transmission unit, and employs a reception time included in the A8 packet to control the time for the transmission of the ratio transmission unit.

Additionally, the AP of the invention is characterized by comprising: a timer, for counting time; and a controller, for employing an A8 concatenation flag to prepare a radio transmission unit, and employing the reception time to perform priority control, either the preparation or transmission of a radio transmission unit.

For a packet according to this invention, the A8 concatenation flag or the A10 concatenation flag is stored in a GRE header.

Furthermore, for the packet of this invention, the A8 concatenation flag or the A10 concatenation flag and time information are stored in the GRE header.

Further, for the packet of this invention, the A8 concatenation flag or the A10 concatenation flag and a protocol reference are stored following the GRE header.

In addition, for the packet of this invention, the A8 concatenation flag or the A10 concatenation flag, time information and a protocol reference are stored following the GRE header.

Advantages of the Invention

The PDSN adds, to an A10 packet prepared by dividing an IP packet, an A10 concatenation flag indicating the A10 packet includes a data fragment corresponding to the head or the tail of the IP packet. When the PCF generates an A8 packet based on the A10 packet, the PCF adds an A8 concatenation flag indicating the A8 packet includes a data fragment corresponding to the head or the tail of the IP packet. By examining the A10 concatenation flag or the A8 concatenation flag, the PCF or the AP can detect a break between the IP packets.

The PCF and the AP employ the A10 concatenation flag and the A8 concatenation flag respectively to manage the transmission and abandonment of data in buffers for each IP packet unit. Thus, the transmission of an IP packet from which a part is missing can be prevented, and the number of useless data transmission events can be reduced. Further, since the PDSN adds the IP packet reception time to an A8/A10 packet, and the AP performs delay fluctuation control, for each IP packet, fluctuation control can be performed at the RAN interval. Further, the PDSN forms packets, by dividing an IP packet, and sequentially transmits them beginning at the head of the IP packet. The packets are received by the AP in order, and the AP sequentially stores data for one IP packet in each wireless packet. Thus, the AP can form wireless packets without having to prevent the information obtained by dividing multiple IP packets from being nested. Since the MS sequentially receives data as an IP packet unit, the MS can reproduce an IP packet by referring to the packet length included in the header of the IP packet.

EMBODIMENT 1

An example is shown in FIG. 8, wherein a PDSN 3 (a device configuration illustration is presented in FIG. 11) stores, in information obtained by dividing an IP packet, information indicating a break between IP packets. The PDSN is located at the boundary between a core network and a RAN, and performs conversion for an IP protocol used for the core network and a protocol used for the RAN. Assume that a network interface 255 of the PDSN 3 receives IP packets 80 and 81. A controller 252 holds the received information in a storage unit 251 to disassemble or assemble a packet. The controller 252 of the PDSN 3 prepares PPP packets 82 and 83 respectively based on the IP packets 80 and 81, and also prepares frames 84 and 85.

The controller 252 of the PDSN 3 divides the frame 84 into data fragments 94, 97, . . . and 100, and forms A10 packets 86, 87, . . . and 88, respectively. At this time, the controller 252 adds an IP header 92 and a GRE header 93 to the data fragment 94. Further, the controller 252 adds an IP header 95 and a GRE header 96 to the data fragment 97. Also, the controller 252 adds an IP header 98 and a GRE header 99 to the data fragment 100.

The controller 252 divides the frame 85 into data fragments 103, 106, . . . and 109, and prepares A10 packets 89, 90, . . . and 91, respectively. At this time, the controller 252 adds an IP header 101 and a GRE header 102 to the data fragment 103. Furthermore, the controller 252 adds an IP header 104 and a GRE header 105 to the data fragment 106. Also, the controller 252 adds an IP header 107 and a GRE header 108 to the data fragment 109.

As fields for storing information that indicates a break between IP packets, A10 concatenation flags 161, 162, 163, 165, 166 and 167 are provided for the GRE headers of the A10 packets 86, 87, 88, 90, 91 and 92, respectively. The A10 concatenation flag represents the position of a data fragment in an IP packet, and can consist of two bits. When a data fragment is information at the head of an IP packet, the first bit is 1, and when it is not, the first bit is 0. When a data fragment is information at the tail of an IP packet, the second bit is 1, and when it is not, the second bit is 0. For the A10 concatenation flags in the drawing, the first bit is shown on the left and the second bit is shown on the right. In this embodiment, the field for the A10 concatenation flag is provided by re-defining a conventional GRE header. For example, a field for a concatenation flag may be provided for an area (Reserved area) not used for controlling a conventional GRE header.

In this case, the data fragment 94 includes information at the head of the IP packet 80. Further, information obtained by dividing the IP packet 80 is included in the data fragments 97 and 100 that are to follow the data fragment 94, and the data fragment 94 does not include information at the tail of the IP packet 80. Therefore, the controller 252 sets to 1 the first bit and sets to 0 the second bit of the A10 concatenation flag 161 that is to be added to the data fragment 94. The data fragment 97 does not include either information at the head of the IP packet 80 or information at the tail of the IP packet 80. Therefore, the controller 252 sets to 0 the first bit and the second bit of the A10 concatenation flag 162 to be added to the data fragment 97. The data fragment 100 does not include information at the head of the IP packet 80 and include information at the tail of the IP packet. Thus, the controller 252 sets to 0 the first bit and sets to 1 the second bit of the A10 concatenation flag 163 to be added to the data fragment 100.

For the division of the IP packet 81, control information is added in the same manner. The data fragment 103 includes information at the head of the IP packet 81. Further, information obtained by dividing the IP packet 81 is included in the data fragments 106 and 109 that are to follow the data fragment 103, and the data fragment 103 does not include information at the tail of the IP packet 81. Therefore, the controller 252 sets to 1 the first bit and sets to 0 the second bit of the A10 concatenation flag 165 to be added to the data fragment 103. The data fragment 106 includes neither information at the head of the IP packet 81 nor information at the tail of the IP packet. Therefore, the controller 252 sets to 0 the first bit and the second bit of the A10 concatenation flag 166 to be added to the data fragment 106. The data fragment 109 does not include information at the head of the IP packet 81, and includes information at the tail of the IP packet 81. Thus, the controller 252 sets to 0 the first bit and sets to 1 the second bit of the A10 concatenation flag 167 to be added to the data fragment 109.

The PDSN 3 transmits an A10 packet through a network interface 250 in an order that maintains the arrangement of the information in one IP packet. For example, for the IP packet 80, the PDSN 3 first transmits the A10 packet 86 that includes information at the head of the IP packet. Then, the PDSN 3 transmits the A10 packet 87. Finally, the PDSN 3 transmits the A10 packet 88 that includes the information at the tail of the IP packet 80. In the same manner as for the IP packet 81, the PDSN 3 first transmits the A10 packet 89 that includes information at the head of the IP packet 81. Then, the PDSN 3 transmits the A10 packet 90. Finally, the PDSN 3 transmits the A10 packet 91 that includes the information at the tail of the IP packet 81. In this embodiment and other embodiments, the storing and transfer of data fragments are performed while the arrangement order for the information in an IP packet is maintained. Therefore, it can be determined that packets, from a packet having a flag that indicates a data fragment at the head of an IP packet to a packet having a flag that indicates a data fragment at the tail of the IP packet, are related to the same IP packet. Therefore, in this invention, a data transfer/abandon process performed by the IP packet unit can be performed without, for example, including ID information for an IP packet.

EMBODIMENT 2

The following is an example wherein a PCF 4 (shown in FIGS. 12 and 13) includes, in information obtained by dividing an IP packet stored in a storage unit, information that indicates a break between IP packets. Assume that A10 packets 86, 87 and 88, prepared by dividing an IP packet 80, are input to the PCF 4. An example packet format is shown in FIG. 9 for a case wherein the PCF 4 does not divide data fragments 94, 97 and 100 of the A10 packets 86, 87 and 88. A CPU 308 of the PCF 4 forms A8 packets 186, 187 and 188 by adding control information respectively to the data fragments 94, 97 and 100. To form the A8 packet 186, the PCF 4 adds an IP header 192 and a GRE header 193 to the data fragment 94 of the A10 packet 86. At this time, the A10 concatenation flag 161 of the A10 packet is replaced with an A8 concatenation flag 181 of the A8 packet. Similarly, to from the A8 packet 187, the PCF 4 adds an IP header 195 and a GRE header 196 to the data fragment 97 of the A10 packet 87. At this time, the A10 concatenation flag 162 of the A10 packet is replaced with an A8 concatenation flag 182 of the A8 packet.

Furthermore, the PCF 4 adds an IP header 198 and a GRE header 199 to the data fragment 100 of the A10 packet 88, and prepares the A8 packet 188. At this time, the A10 concatenation flag 163 of the A10 packet is replaced with an A8 concatenation flag 183 of the A8 packet. The PCF 4 removes the IP headers 92, 95 and 98 of the received A10 packets 86, 87 and 88, and adds different IP headers 192, 195 and 198, which include addresses at the transmission destinations of the individual A8 packets. Further, the PCF 4 replaces part of the information (GRE keys and sequence numbers) in the GRE headers 93, 96 and 99 with the GRE headers 193, 196 and 199. Further, the A10 concatenation flags of the GRE headers 93, 96 and 99 are copied as A8 concatenation flags of those GRE headers 193, 196 and 199.

An example packet format is shown in FIG. 10 for a case wherein the PCF divides the data fragments 94, 97 and 100 of the A10 packets 86, 87 and 88. The PCF divides the data fragment 94 of a received A10 packet into data fragments 203 and 206, and prepares A8 packets 230 and 231 by adding control information to the data fragments 203 and 206, respectively. The PCF 4 examines the A10 concatenation flag 161, and determines that the data fragment 94 includes information at the head of the IP packet 80 and does not include information at the tail of the IP packet 80. Therefore, since the data fragment 203 that is the first half includes information at the head of the IP packet 80, the PCF 4 sets to 1 the first bit and sets to 0 the second bit of an A8 concatenation flag 221 to be added to the data fragment 203. And the PCF 4 sets to 0 the first bit and the second bit of an A8 concatenation flag 222 to be added to the data fragment 206, which is the second half. The PCF 4 divides the data fragment 97 of the received A10 packet into data fragment 209 and 210, and prepares A8 packets 232 and 233 by adding control information to these data fragments, respectively. The PCF 4 examines the A10 concatenation flag 162, and determines that the data fragment 97 includes neither information at the head of the IP packet 80 nor information at the tail of the IP packet. Thus, the PCF 4 sets to 0 the first bits and the second bits of A8 concatenation flags 223 and 224 that are to be added to the data fragments 209 and 212.

The PCF 4 divides the data fragment 100 of the received A10 packet into data fragments 215 and 218, and prepares A8 packets 235 and 235 by adding control information to these data fragments, respectively. The PCF 4 examines the A10 concatenation flag 163 and determines that the data fragment 100 does not include information at the head of the IP packet 80, and includes information at the tail of the IP packet. That is, information at the tail of the IP packet 80 is included in the data fragment 218 that is the second half of the fragment divided by the PCF 4. The PCF 4 sets to 0 the first bit and the second bit of an A8 concatenation flag 221 to be added to the data fragment 215, which is the first half fragment. And the PCF 4 sets to 0 the first bit and to 1 the second bit of an A8 concatenation flag 226 to be added to the A8 concatenation flag 218, which is the second half fragment.

As described in the example, the PDSN 3 transmits the A10 packets in an order that insures the arrangement of the information in the IP packet is maintained. The PCF 4 also transmits A8 packets in an order that ensures the arrangement of the information in the IP packet is maintained.

For example, for the IP packet 80, the PCF 4 first transmits the A8 packet 186 that includes information at the head of the IP packet 80. Then, the PCF 4 transmits the A8 packet 187. Finally, the PCF 4 transmits the A8 packet 188 that includes information at the tail of the IP packet 80. When the AP receives the A8 packets 186, 187 and 188, it is ensured that this order is maintained.

EMBODIMENT 3

An example configuration for a PDSN 3 of the invention is shown in FIG. 11. An NW IF 250 is a network interface having a network connected to a PCF 4. An NW IF 255 is a network interface having a network connected to a border router 2. A storage unit 251 holds a received IP packet and an A8 packet to be transmitted. A controller 252 manages packet transmission/reception, manages information held in the storage unit 251, assembles/disassembles an A10 packet, and measures a reception time for an IP packet. A UIF 253 is a user interface. A timer 254 is a counter that increments a value in accordance with a specified timing, and is used for the measurement of IP packet reception time.

EMBODIMENT 4

An example for a PCF 4 according to this invention is shown in FIG. 12. NW IF 301 and 306 are network interfaces. SW 302 and 305 are switches for exchanging signals. A controller 303 provides overall management for the PCF 4 and provides call control. A traffic controller TC 304 performs assembly/disassembly and transmission/reception for an A8 packet and an A10 packet. An example for the traffic controller TC 304 of this invention is shown in FIG. 13. A controller 307 holds packet data to be transmitted and received packet data, and management information. A CPU 308 manages packet transmission/reception, manages information held in a storage unit 307, assembles/disassembles an A8 packet and an A10 packet, and measures packet reception time. A timer 309 is a counter that increments a value in accordance with a specified timing, and is used to measure reception time for an A10 packet.

EMBODIMENT 5

An example for an AP 5 according to the present invention is shown in FIG. 14. The AP 5 is a radio base station that serves as an access point for MSs 8 and 340 carried by a RAN 9. An NW IF 320 is an interface whereat a network is connected to a PCF 4. A BB 321 performs a baseband process, i.e., performs modulation for a transmission signal, and performs synchronous supplement and demodulation for a received signal. An IF 322 performs the intermediate frequency (IF) signal processing. The IF 322 performs DA (Digital to Analog) conversion for a baseband signal input by the BB 321, then converts the resultant signal into an intermediate frequency signal and outputs this signal to an RF 323. Further, the IF 322 performs AD (Analog to Digital) conversion for a signal received from the RF 323, and outputs the obtained signal to the BB 321. The RF 323 performs the radio frequency (RF) signal processing. The RF 323 increases the frequency of a signal received from the IF 322 to a radio frequency, amplifies the transmission power, and outputs the resultant signal to an antenna 328. The RF 323 reduces the frequency of a signal received at the antenna 328 to an intermediate frequency, and outputs the resultant signal to the IF 322. A controller 326 includes a function for managing the entire AP. The controller 326 assembles/disassembles a radio transfer unit and an A8 packet, controls the timing for the transmission of a radio transfer unit, and manages information in the storage unit 325. Further, the controller 326 measures time for reception of an A8 packet. The storage unit 325 stores an A8 packet, a radio transfer unit and management information, such as a stored information management table 450. A timer 327 is a counter increments a value in accordance with a specified timing.

EMBODIMENT 6

The following is an example wherein the PCF 4 controls packet transmission in accordance with a cluster of IP packets. Assume that, as an area for holding information to be transmitted, a transmission queue buffer 112 is provided for a storage unit 307 of the PCF 4. An example in FIG. 15 is shown as the transmission queue buffer 112 of the storage unit 307 of the PCF 4. The data fragments of A10 packets the PCF 4 received from a PDSN 3 are stored in the transmission queue buffer 112. The data fragments are sequentially stored in the transmission queue buffer 112 in the order as they were received by the PCF 4. The CPU 308 of the PCF 3 prepares an A8 packet based on the data fragments stored in the transmission queue buffer 112, and transmits the A8 packet to the AP 5. An explanation will now be given for an example of the abandonment of packets as a cluster of IP packets in the transmission queue buffer 112.

The CPU 308 manages data stored in the transmission queue buffer 112. FIG. 17 shows an example of the stored information management table 450 held in the storage unit 307. The CPU 308 enters, in a column 451, the IP header of an A10 packet received by the PCF 4, and enters, in a column 452, the GRE header of the A10 packet. The CPU 308 also enters, in a column 452, a start address in the buffer 112 where the data fragment of the A10 packet received by the PCF 4 is stored. The CPU 308 enters, in a column 453, an end address in the buffer 112 where the data fragment of the A10 packet received by the PCF 4 is stored. Further, the CPU 308 writes, in a column 455, the reception time at which the PCF 4 received the A10 packet. At this time, time is measured by the timer 309 of the PCF 4.

Assume that an A10 packet including the data fragment 110 is received by the PCF 4 in a state wherein the transmission queue buffer 112 is empty. The CPU 308 records the IP header of the A10 packet in the row 460 and column 451 field of the table. Further, the CPU 308 records the GRE header, including the A10 concatenation flag of the A10 packet, in the row 460 and column 452 field of the table.

Furthermore, as a start address for storing the data fragment 110 of the A10 packet, the CPU 308 records the head address of the buffer 112 in the row 460 and column 453 field. As an end address for storing the data fragment 110 of the A10 packet, the CPU 308 also records, in the row 460 and column 454 field, the address obtained by adding the length of the data fragment 110 to the head address of the buffer 112. At this time, the length of the data fragment 110 is obtained by subtracting the number of octets for the IP header and the GRE header from the number of octets for the IP packet, which is included in the IP header of the A10 packet. The CPU 308 records, in the row 460 and column 455 field, the reception time, for the A10 packet, that is measured by the timer 309 of the PCF 4. Then, the CPU 308 stores the data fragment 110 in the area from the start address to the end address that are recorded in the row 460.

Furthermore, assume that the PCF 8 has received the A10 packet 86. The CPU 308 records the IP header 92 of the A10 packet 86 in the row 461 and column 451 field of the table. The CPU 308 also records the GRE header 93, including the A10 concatenation flag of the A10 packet 86, in the row 461 and column 452 field of the table. Further, as the start address for storing the data fragment 94 of the A10 packet 86, the CPU 308 records, in the row 461 and column 453 field, an address obtained by incrementing, by one octet, the end address of the data fragment 110. Furthermore, as an end address for storing the data fragment 94 of the A10 packet, the CPU 308 records, in the row 461 and column 454 field, an address obtained by adding the length of the data fragment 94 to the start address recorded in the row 461 and column 453 field. At this time, the length of the data fragment 94 is obtained by subtracting the number of octets for the IP header 92 and the GRE header 93 from the number of octets for the IP packet, which is included in the IP header 92 of the A10 packet 86. The CPU 308 records, in the row 461 and column 455 field, the reception time, for the A10 packet 86, measured by the timer 309 of the PCF 4. Then, the CPU 308 stores the data fragment 94 in the area from the start address to the end address recorded in the row 461.

In the same manner, the CPU 308 stores the data fragments 97, 100, 103, 106, 109 and 111 in the buffer 112. Further, the CPU 308 records control information 451, 452, 453 and 454, consonant with the corresponding data fragments, in the individual rows of the stored information management table 450.

Before the PCF 8 prepares an A8 packet by adding the IP header and the GRE header to the data fragment 110 and transmits it to the AP 5, the CPU 308 abandons information in the row 460, and employs information in the row 461 to overwrite. Furthermore, an address is obtained by subtracting the length of the data fragment 110 from the start address recorded in the row 460 and column 453 field, and is recorded as a new start address in the same field. Also, an address is obtained by subtracting the length of the data fragment 110 from the end address recorded in the row 460 and column 454 field, and is recorded as a new end address in the same field.

Likewise, the CPU 308 overwrites information in a specific row in the stored information management table 450 by employing information in the following row. Furthermore, as new addresses, the CPU 308 records the addresses obtained by subtracting the length of the data fragment 110 from the start address 453 and the end address 454 recorded in the corresponding rows. In the buffer 112, the CPU 308 re-stores the data fragments 94, 97, 100, 103, 106, 109 and 111 to fill in the front of the buffer 112 (filled in to the left in FIG. 15).

Suppose that the data fragments 110, 97, 100, 103, 106 and 109 are currently stored in the buffer 112, and an A10 packet that includes the data fragment 111 is input to the PCF 4. The CPU 308 begins storing the data fragment 111 in the buffer 112, and records control information for the data fragment 111 in the row 462 of the stored information management table 450. Assume that a value exceeding an area obtained as the buffer 112 is obtained as the end address of the data fragment 111. Then, the CPU 308 determines that the free space in the buffer 112 is insufficient. Thus, the CPU 308 examines the TOS for the IP header recorded in the stored information management table 450, and finds information stored in the buffer 112 that is to be abandoned.

Suppose that the priority levels for packet abandonment indicated by the TOSs for the data fragments 110, 103, 106, 109 and 111 are higher than those for the data fragments 94, 97 and 100. Also assume that the length of the data fragment 110 is equal to or smaller than the length of the data fragment 94. The CPU 308 calculates the length of each data fragment based on the IP header 451. Then, the CPU 308 determines that the data fragment 111 can be stored in the buffer 112 by abandoning the data fragment 94. Further, the CPU 308 examines the A10 concatenation flag included in the GRE header 452, and determines that the data fragments 94, 97 and 100 are data constituting one IP packet 80. If one of the data fragments 94, 97 and 100 is missing, the IP packet can not be reconfigured, and transfer of the other data fragments would be a useless event for the network. In order to avoid this useless transfer, the CPU 308 abandons the data fragments 94, 97 and 100, instead of abandoning only the data fragment 94. In the buffer 112, the CPU 308 stores the data fragments 103, 106, 109 and 111, following the data fragment 110.

Furthermore, the CPU 308 updates the stored information management table 450. The CPU 308 abandons rows corresponding to the data fragments 94, 97 and 100. The CPU 308 abandons information in the row 461 corresponding to the data fragment 94 by overwriting it with information corresponding to the data fragment 103. An address is calculated by subtracting, from the start address recorded in the row 461 and column 453 field, the total length of the abandoned data fragments 94, 97 and 100, and this is recorded as a new start address in the row 461 and column 453 field. Further, an address is calculated by subtracting, from the end address recorded in the row 461 and column 454 field, the total length of the abandoned data fragments 94, 97 and 100, and this is recorded as a new end address in the row 461 and column 454 field. The CPU 308 abandons information in the row following the row 461 that corresponds to the data fragment 97, and overwrites it with information corresponding to the data fragment 106. An address is calculated by subtracting, from the original start address, the total length of the abandoned data fragments 94, 97 and 100, and this is recorded as a new start address in the field that is in the column 453, in the row following the row 461. Further, an address is calculated by subtracting, from the original end address, the total length of the abandoned data fragments 94, 97 and 100, and is recorded as a new end address in the field that is in the column 454, in the row following the row 461.

Hereinafter, likewise, from the top row in the table 450, the CPU 308 records information consonant with the data fragments 109 and 111 in the order received by the PCF 4. Then, an address is calculated by subtracting, from the original start address 453, the total length of the abandoned data fragments 94, 97 and 100, and this is recorded as a new start address 453. And an address is calculated by subtracting, from the original end address 454, the total length of the abandoned data fragments 94, 97 and 100, and this is recorded as a new start address 454.

EMBODIMENT 7

An example wherein a PCF 4 performs transmission control for each IP packet will be explained. An example buffer for the PCF 4 of this embodiment is shown in FIG. 16. Assume that EF (Expedited Forwarding) is set for the TOS for the IP header of an IP packet 80. When a PDSN 3 creates A10 packets 86, 87 and 88, EF is set as the TOS field values for individual IP headers 92, 95 and 98. Further, the PDSN 3 sets the lengths of the A10 packets 86, 87 and 88 in the Length fields of the IP headers 92, 95 and 98. The PDSN 3 transmits the A10 packets 86, 87 and 88 to the PCF 4.

Suppose that a data fragment 110 is already stored in a buffer 112. Further, assume that information in a row 460 of stored information management table 450 for the PCF 4 is control information in a data fragment 110. When the PCF 4 receives the A10 packet 86, a CPU 308 records control information for the A10 packet in columns 451, 452, 453 and 454 along the row 461. Further, the CPU 308 employs a timer 309 to measure the reception time for the A10 packet 86, and records this time in the row 461 and column 455. The CPU 308 stores a data fragment 94 in the buffer 112. Further, when the PCF 4 receives an A10 packet 87, the CPU 308 records control information in the A10 packet in the columns 451, 452, 453 and 454 along the row following the row 461. Further, the CPU 308 employs the timer 309 to measure the reception time for the A10 packet 87 and records it in the column 455 in the row following the row 461. The CPU 308 stores a data fragment 97 in the buffer 112.

Based on the A10 concatenation flag included in a GRE, etc., the CPU 308 determines that the data fragment 94 is a data fragment at the head of the IP packet 80, and while input time 455 recorded in the row 461 is employed as a reference, waits for the arrival of the last data fragment 100 for a predetermined period of time. Assume that, as shown in FIG. 16, since the first data fragment 94 of the IP packet 80 was input to the PCF 4, the last data fragment 100 is not input to the PCF 4 for a predetermined period of time or longer. And assume that data fragment 97 of the IP packet 80 has currently been received. The CPU 308 examines the A10 concatenation flag of the GRE header 452 in the row 461, and determines whether the pertinent data fragment is the last for the IP packet. The IP packet can not be reconfigured using only the data fragments 94 and 97. Further, there is a large delay in the transfer of the A10 packet, and even when the PCF 4 is waiting for the arrival of the data fragment 100, which includes information, at the tail of the IP packet 80, the delay time for the transmission of the IP packet would be increased. Thus, the PCF 4 abandons the data fragments of the IP packet 80.

First, the CPU 308 examines the A10 concatenation flag in the GRE header 452 of the stored information management table 450, and searches for data to be abandoned. Beginning with the row following the last row 461, the CPU 308 traces backward the A10 concatenation flags to identify the data fragment at the head of the IP packet. Based on the A10 concatenation flag in the row 461, the CPU 308 determines that the data fragment 94 is the head of the IP packet 80. And the CPU 308 determines that data to be abandoned is a data fragment managed in the rows following the row 461. Thus, the CPU 308 abandons information in the area designated from the start address 453 to the end address 454 in each row.

The CPU 308 of the PCF 4 abandons, in the buffer 112, the data fragments 94 and 97 that have already been received. Furthermore, in the stored information management table 450, the CPU 308 abandons information recorded in the row 461 and the succeeding row, corresponding to the data fragments 94 and 97. In addition, the CPU 308 of the PCF 4 determines which A10 packets were received before the data fragment 100, at the tail of the IP packet 80, was received, or before the data fragment at the head of the next IP packet was received, and abandons these packets.

In this case, the above described predetermined period of time may be set for individually designated classes. For example, when the TOS is EF, the predetermined period that may be set is the shortest, and when the TOS is AF, the predetermined period that may be set is longer than when the TOS is EF.

EMBODIMENT 8

An example wherein an AP 5 manages packet transmission in accordance with a cluster of IP packets will be explained below. As an area for holding information to be transmitted, a transmission queue buffer 113 is provided for a storage unit 325 of the AP 5. FIG. 18 shows an example for the transmission queue buffer 113 of the storage unit 325 of the AP 5. The data fragments of an A8 packet that the AP 5 received from the PCF 4 are stored in the transmission queue buffer 113. In the order the data fragments are received by the AP 5, they are sequentially stored in the transmission queue buffer 113. The controller 326 of the AP 5 prepares an RLP packet or an ECB based on data fragments stored in the transmission queue buffer 113. An explanation will be given for the abandoning of packets as a cluster for IP packets in the transmission queue buffer 113.

A controller 326 of the AP 5 manages data stored in the transmission queue buffer 113. FIG. 17 is an example for the stored information management table 450 held in the storage unit 325. The AP as well as the PCF performs transmission and management of packets under the same entries. The controller 326 enters, in a column 451, the IP header of an A8 packet received by the AP 5, and enters, in a column 452, the GRE header of the A8 packet. The controller 326 also enters, in a column 452, a start address in the buffer 113 where the data fragment of the A8 packet received by the AP 5 is stored. The controller 326 enters, in a column 453, an end address in the buffer 113 where the data fragment of the A8 packet received by the AP 5 is stored. Further, the controller 326 writes, in a column 455, the reception time at which the AP 5 received the A8 packet. At this time, time is measured by the timer 327 of the AP 5.

Assume that an A8 packet including the data fragment 110 is received by the AP 5 in a state wherein the transmission queue buffer 113 is empty. The controller 326 records the IP header of the A8 packet in the row 460 and column 451 field of the table. Further, the controller 326 records the GRE header, including the A8 concatenation flag of the A8 packet, in the row 460 and column 452 field of the table. Furthermore, as a start address for storing the data fragment 110 of the A8 packet, the controller 326 records the head address of the buffer 113 in the row 460 and column 453 field. As an end address for storing the data fragment 110 of the A8 packet, the controller 326 also records, in the row 460 and column 454 field, the address obtained by adding the length of the data fragment 110 to the head address of the buffer 113. At this time, the length of the data fragment 110 is obtained by subtracting the number of octets for the IP header and the GRE header from the number of octets for the IP packet, which is included in the IP header of the A8 packet. The controller 326 records, in the row 460 and column 455 field, the reception time, for the A8 packet, that is measured by the timer 327 of the AP 5. Then, the controller 326 stores the data fragment 110 in the area from the start address to the end address that are recorded in the row 460.

Furthermore, assume that the AP 5 has received the A8 packet 186. The controller 326 records the IP header 192 of the A8 packet 186 in the row 461 and column 451 field of the table. The controller 326 also records the GRE header 193, including the A8 concatenation flag of the A8 packet 186, in the row 461 and column 452 field of the table. Further, as the start address for storing the data fragment 194 of the A8 packet 186, the controller 326 records, in the row 461 and column 453 field, an address obtained by incrementing, by one octet, the end address of the data fragment 110. Furthermore, as an end address for storing the data fragment 94 of the A8 packet, the controller 326 records, in the row 461 and column 454 field, an address obtained by adding the length of the data fragment 94 to the start address recorded in the row 461 and column 453 field. At this time, the length of the data fragment 94 is obtained by subtracting the number of octets for the IP header 192 and the GRE header 193 from the number of octets for the IP packet, which is included in the IP header 192 of the A8 packet 186. The controller 326 records, in the row 461 and column 455 field, the reception time, for the A8 packet 186, measured by the timer 327 of the AP 5. Then, the controller 326 stores the data fragment 94 in the area from the start address to the end address recorded in the row 461.

In the same manner, the controller 326 stores the data fragments 97, 100, 103, 106, 109 and 111 in the buffer 113. Further, the controller 326 records control information 451, 452, 453 and 454, consonant with the corresponding data fragments, in the individual rows of the stored information management table 450.

In the case wherein transmission of the data fragment 110 is completed, the controller 326 discards information in the row 460, and employs information in the row 461 to overwrite. Furthermore, an address is obtained by subtracting the length of the data fragment 110 from the start address recorded in the row 460 and column 453 field, and is recorded as a new start address in the same field. Also, an address is obtained by subtracting the length of the data fragment 110 from the end address recorded in the row 460 and column 454 field, and is recorded as a new end address in the same field.

Likewise, the controller 326 overwrites information in a specific row in the stored information management table 450 by employing information in the following row. Furthermore, as new addresses, the controller 326 records the addresses obtained by subtracting the length of the data fragment 110 from the start address 453 and the end address 454 recorded in the corresponding rows.

In the buffer 113, the controller 326 re-stores the data fragments 94, 97, 100, 103, 106, 109 and 111 to fill in the front of the buffer 112 (filled in to the left in FIG. 18).

Suppose that the data fragments 110, 97, 100, 103, 106 and 109 are currently stored in the buffer 113, and an A8 packet that includes the data fragment 111 is input to the AP 5. The controller 326 begins storing the data fragment 111 in the buffer 113, and records control information for the data fragment 111 in the row 462 of the stored information management table 450. Assume that a value exceeding an area obtained as the buffer 113 is obtained as the end address of the data fragment 111.

The controller 326 determines that the free space in the buffer 113 is insufficient. Thus, the controller 326 examines the TOS for the IP header recorded in the stored information management table 450, and finds information stored in the buffer 113 that is to be discarded. Suppose that the priority levels for packet abandonment indicated by the TOSs for the data fragments 110, 103, 106, 109 and 111 are higher than those for the data fragments 94, 97 and 100. Also assume that the length of the data fragment 110 is equal to or smaller than the length of the data fragment 94. The controller 326 calculates the length of each data fragment based on the IP header 451. Then, the controller 326 determines that the data fragment 111 can be stored in the buffer 113 by abandoning the data fragment 94. Further, the controller 326 examines the A8 concatenation flag included in the GRE header 452, and determines that the data fragments 94, 97 and 100 are data constituting one IP packet 80. If one of the data fragments 94, 97 and 100 is missing, the IP packet 80 can not be reconfigured, and transfer of the other data fragments would be a useless event for the network. In order to avoid this useless transfer, the controller 326 discards the data fragments 94, 97 and 100, instead of discarding only the data fragment 94. In the buffer 113, the controller 326 stores the data fragments 103, 106, 109 and 111, following the data fragment 110.

Furthermore, the controller 326 updates the stored information management table 450. The controller 326 abandons rows corresponding to the data fragments 94, 97 and 100. The controller 326 abandons information in the row 461 corresponding to the data fragment 94 by overwriting it with information corresponding to the data fragment 103. An address is calculated by subtracting, from the start address recorded in the row 461 and column 453 field, the total length of the abandoned data fragments 94, 97 and 100, and this is recorded as a new start address in the row 461 and column 453 field. Further, an address is calculated by subtracting, from the end address recorded in the row 461 and column 454 field, the total length of the abandoned data fragments 94, 97 and 100, and this is recorded as a new end address in the row 461 and column 454 field. The controller 326 discards information in the row following the row 461 that corresponds to the data fragment 97, and overwrites it with information corresponding to the data fragment 106. An address is calculated by subtracting, from the original start address, the total length of the abandoned data fragments 94, 97 and 100, and this is recorded as a new start address in the field that is in the column 453, in the row following the row 461. Further, an address is calculated by subtracting, from the original end address, the total length of the abandoned data fragments 94, 97 and 100, and is recorded as a new end address in the field that is in the column 454, in the row following the row 461.

Hereinafter, likewise, from the top row in the table 450, the controller 326 records information consonant with the data fragments 109 and 111 in the order received by the AP 5. Then, an address is calculated by subtracting, from the original start address 453, the total length of the abandoned data fragments 94, 97 and 100, and this is recorded as a new start address 453. And an address is calculated by subtracting, from the original end address 454, the total length of the abandoned data fragments 94, 97 and 100, and this is recorded as a new start address 454.

EMBODIMENT 9

Another example wherein an AP 5 performs packet transmission of a cluster of IP packets will be explained below. An example packet format is shown in FIG. 19.

Assume that IP packets 350 and 351 are input to a PDSN 3. The PDSN 3 divides the IP packet 350 into data fragments 352 and 353 to obtain A10 packets 368 and 369, respectively, and transmits these A10 packets to a PCF 4. Since the A10 packet 368 includes the head of the IP packet 350, the PDSN 3 sets to 1 the first bit and sets to 0 the second bit of an A10 concatenation flag 370. Further, since the A10 packet 369 includes the tail of the IP packet 350, the PDSN 3 sets to 0 the first bit and sets to 1 the second bit of an A10 concatenation flag 371. Furthermore, the PDSN 3 divides the IP packet 351 into data fragments 354 and 355 to obtain A10 packets 372 and 373, respectively, and transmits these A10 packets to the PCF 4. Since the A10 packet 372 includes the head of the IP packet 351, the PDSN 3 sets to 1 the first bit and sets to 0 the second bit of an A10 concatenation flag 374. And since the A10 packet 373 includes the tail of the IP packet 351, the PDSN 3 sets to 0 the first bit and sets to 1 the second bit of an A10 concatenation flag 375.

The PCF 4 receives the A10 packets 368, 369, 372 and 373, configures A8 packets 388, 389, 392 and 393 based on these A10 packets and transmits them to the AP 5. At this time, the PCF 4 copies the A10 concatenation flag to an A8 concatenation flag 390. Further, the PCF 4 copies the A10 concatenation flag 374 to an A8 concatenation flag 394. Furthermore, the PCF 4 copies the A10 concatenation flag 375 to an A8 concatenation flag 395.

Assume that EF is designated as the TOS for the IP packet 350, and Default is designated as the TOS for the IP packet 351. For the configuration of the A10 packets 368 and 369, the PDSN 3 sets EF for the TOSs for IP headers 360 and 362, which are to be added. For the configuration of the A10 packets 372 and 273, the PDSN 3 sets Default for the TOSs for IP headers 364 and 366, which are to be added.

The PCF 4 receives the A10 packets 368, 369, 372 and 373, and configures the A8 packets 388, 389, 392 and 393 based on these A10 packets. At this time, the PCF 4 copies the TOS of the IP header 360 to the TOS of an IP header 380. Further, the PCF 4 copies the TOS for the IP header 362 to the TOS for an IP header 382. In addition, the PCF 4 copies the TOS for the IP header 364 to the TOS for an IP header 384.
Furthermore, the PCF 4 copies the TOS for the IP header 366 to the TOS for IP header 386.

Suppose that the A8 packets 388, 389, 392 and 393 are input to the AP 5 as A10 packets indicating one connection, and that, at this time, the AP 5 receives the A8 packets in an order that ensures the arrangement of the information in the IP packets is maintained. A controller 326 of the AP 5 stores the data fragments 352, 353, 354 and 355 in a transmission buffer 113 of a storage unit 325. Further, the controller 326 of the AP 5 sets, in a table 450, control information for the data fragments 352, 353, 354 and 355. The controller 326 records control information in each row in the order for the A8 packets 388, 389, 392 and 393. The controller 326 enters, to the column 451, the IP header of the A8 packet, received by the AP 5. And the controller 326 enters, in the column 452, the GRE header of the A8 packet received by the AP 5. Further, the controller 326 writes, in the column 452, a start address at which the data fragment of the A8 packet received by the AP 5 is stored. And the controller 326 writes, in the column 453, an end address at which the data fragment of the A8 packet received by the AP 5 is stored. The controller 326 writes, in the column 455, the reception time at which the AP 5 received the A8 packet. At this time, time is measured by the timer 327 of the AP 5.

In accordance with a timing designated by the scheduler function of the controller 326 of the AP 5, the controller 326 employs data fragments stored in the transmission buffer 113 and prepares a packet for radio transmission. A packet for radio transmission is, for example, an RLP packet. Or, the packet may, for example, be an ECB.

The controller 326 examines the GRE header 452 in the table 450, and determines that the data fragments 352 and 353 and the data fragments 354 and 355 respectively constitute the IP packets 350 and 351. Further, the controller 326 examines the TOS for the IP header 451, and determines that the data fragments 352 and 353 of the IP packet 350 belong to the EF class and the data fragments 354 and 355 of the IP packet 351 belong to the Default class. Furthermore, the controller 326 examines the IP header 451, and calculates the lengths of the data fragments 352 and 353 of the IP packet 350 and the lengths of the data fragments 354 and 355 of the IP packet 351. The length of the data fragments is obtained when the controller 326 subtracts the IP header length and the GRE header length from the corresponding A8 packet lengths recorded in the IP header 451. Assume that the data fragments 352, 353, 354 and 355 have lengths such that all of them can not be stored in one RLP packet. Then, as will be described below, the controller 326 stores, for each IP packet, data having high priority levels in an RLP packet, and if there is still space available, stores in the RLP packet data having low priority levels. In a case wherein an IP packet is transmitted among a plurality of RLP packets, an IP packet can not be restored until the information is completed. Using the following method it is possible for data having a high priority level to avoid being divided into a plurality of RLP packets.

First, the controller 326 sequentially stores, in an RLP packet 396, the data fragments 352 and 353 of the IP packet 350, which has a high priority level. Then, when the data fragment 354 of the IP packet 351 having a low priority level is short enough to be stored in the RLP packet 396, the controller 326 also stores the data fragment 354 in the RLP packet 396. Since the data fragment 355 of the IP packet 351 having a low priority level can not be stored in the RLP packet 396, the controller 326 stores the data fragment 355 in the next RLP packet to be prepared.

At this time, the controller 326 maintains the order of the data fragments of the IP packet that are to be stored in the RLP packet. For example, for the IP packet 350, the data fragments 352 and 353 are stored in the RLP packet 396 in the named order. For the IP packet 351, the data fragments 354 and 355, if possible, are stored in the RLP packet 396 in the named order. Or, if insufficient space is available in the RLP packet 396, the data fragment 354 is stored in the RLP packet 396, and then, sequentially the data fragment 355 is stored in the next RLP packet.

The controller 326 may store the data fragments in the RLP packet after the controller 326 confirms that the IP packet unit is completed. By examining the GRE header 452 that includes the A8 concatenation flag, the controller 326 can identify the data fragment at the head of the IP packet and the data fragment at the tail of the IP packet.

Further, when IP packet data is missing, it may be that data for an IP packet is never transmitted by the AP. In a case wherein the data fragment at the tail of an IP packet is not received for a predetermined period or longer since the data fragment at the head of the IP packet was received, the controller 326 may abandon the data fragments for the pertinent IP packet unit.

EMBODIMENT 10

Another example wherein an AP 5 performs packet transmission of a cluster of IP packets will be explained below. In the example, the AP 5 prepares a packet for radio transmission by employing data fragments of a plurality of A8 connections, for which the same destination terminal MS is provided.

An example packet format is shown in FIG. 20.

Assume that IP packets 350 and 351 are input to a PDSN 3. The PDSN 3 divides the IP packet 350 into data fragments 352 and 353 to obtain A10 packets 368 and 369, respectively, and transmits these A10 packets to a PCF 4. Since the A10 packet 368 includes the head of the IP packet 350, the PDSN 3 sets to 1 the first bit and sets to 0 the second bit of an A10 concatenation flag 370. Further, since the A10 packet 369 includes the tail of the IP packet 350, the PDSN 3 sets to 0 the first bit and sets to 1 the second bit of an A10 concatenation flag 371. Furthermore, the PDSN 3 divides the IP packet 351 into data fragments 354 and 355 to obtain A10 packets 372 and 373, respectively, and transmits these A10 packets to the PCF 4. Since the A10 packet 372 includes the head of the IP packet 351, the PDSN 3 sets to 1 the first bit and sets to 0 the second bit of an A10 concatenation flag 374. And since the A10 packet 373 includes the tail of the IP packet 351, the PDSN 3 sets to 0 the first bit and sets to 1 the second bit of an A10 concatenation flag 375.

The PCF 4 receives the A10 packets 368, 369, 372 and 373, configures A8 packets 388, 389, 392 and 292, based on these A10 packets, and transmits them to the AP 5. At this time, the PCF 4 copies the A10 concatenation flag to an A8 concatenation flag 390. Further, the PCF 4 copies the A10 concatenation flag 374 to an A8 concatenation flag 394. Furthermore, the PCF 4 copies the A10 concatenation flag 375 to an A8 concatenation flag 395.

Assume that the A8 packets 388 and 389 that include the data fragments of the IP packet 350 are input to connection #1 of the AP 5. Further, assume that the A8 packets 392 and 393 that include the data fragments of the IP packet 351 are input to connection #2 of the AP 5.

Suppose that, at this time, the AP 5 receives the A8 packets in each connection in an order such that the arrangement of the information of the IP packets is maintained. A controller 326 of the AP 5 stores the data fragments 352, 353, 354 and 355 in a transmission buffer 113 of a storage unit 325. Further, the controller 326 of the AP 5 sets, in a table 450, control information for the data fragments 352, 353, 354 and 355. The controller 326 records control information in each row in the order of the A8 packets 388, 389, 392 and 393. The controller 326 enters, in the column 451, the IP header of the A8 packet received by the AP 5. And the controller 326 enters, in the column 452, the GRE header of the A8 packet received by the AP 5. Further, the controller 326 writes, in the column 452, a start address at which the data fragment of the A8 packet received by the AP 5 is stored. And the controller 326 writes, in the column 453, an end address at which the data fragment of the A8 packet received by the AP 5 is stored. The controller 326 writes, in the column 455, the reception time at which the AP 5 received the A8 packet. At this time, time is measured by the timer 327 of the AP 5.

In accordance with a timing designated by the scheduler function of the controller 326 of the AP 5, the controller 326 employs data fragments stored in the transmission buffer 113 and prepares a packet for radio transmission. A packet for radio transmission is, for example, an RLP packet. Or, the packet may, for example, be an ECB.

The controller 326 examines the GRE header 452 in the table 450, and determines that the data fragments 352 and 353 and the data fragments 354 and 355 respectively constitute the IP packets 350 and 351.

The controller 326 sequentially stores the data fragments 353 and 353 of the IP packet 350 in the RLP packet 396. Furthermore, the controller 326 sequentially stores the data fragments 354 and 355 of the IP packet 351 in the RLP packet 396.

At this time, the controller 326 maintains the order of the data fragments of the IP packet to be stored in the RLP packet. For example, for the IP packet 350, the data fragments 352 and 353 are stored in the RLP packet 396 in the named order. For the IP packet 351, the data fragments 354 and 355, if possible, are stored in the RLP packet 396 in the named order. Or, if not sufficient space is available in the RLP packet 396, the data fragment 354 is stored in the RLP packet 396, and then, sequentially, the data fragment 355 is stored in the next RLP packet.

The controller 326 may store the data fragments in the RLP packet after the controller 326 confirms that the IP packet unit is completed. By examining the GRE header 452 that includes the A8 concatenation flag, the controller 326 can identify the data fragment at the head of the IP packet and the data fragment at the tail of the IP packet.

Further, when IP packet data for connection #1 or connection #2 is missing, it may be that data for an IP packet was never transmitted by the AP. In a case wherein the data fragment at the tail of an IP packet is not received for a predetermined period or longer, since the data fragment at the head of the IP packet was received, the controller 326 may abandon the data fragments of the pertinent IP packet unit. An embodiment wherein an AP abandons data fragments is shown below.

EMBODIMENT 11

An example wherein an AP 5 performs transmission control for a cluster of IP packets will be explained. An example buffer for the AP 5 of this embodiment is shown in FIG. 21.

Assume that EF is set for the TOS for the IP header of an IP packet 80. When a PDSN 3 creates A10 packets 86, 87 and 88, EF is set as the TOS field values for individual IP headers 92, 95 and 98. Further, the PDSN 3 sets the lengths of the A10 packets 86, 87 and 88 in the Length fields of the IP headers 92, 95 and 98. The PDSN 3 transmits the A10 packets 86, 87 and 88 to the PCF 4.

When the PCF 4 creates A8 packets 186, 187 and 188, EF is set as the TOS field values for individual IP headers 192, 195 and 198. Further, the PDF 4 sets the lengths of the A8 packets 186, 187 and 188 in the Length fields of the IP headers 192, 195 and 198. The PCF 4 transmits the A8 packets 186, 187 and 188 to the AP 5.

Suppose that a data fragment 110 is already stored in a buffer 113 of the AP 5. Further, assume that information in a row 460 of stored information management table 450 for the AP 5 is control information in the data fragment 110. When the AP 5 receives the A8 packet 186, a controller 326 records control information for the A8 packet in columns 451, 452, 453 and 454 along the row 461. Further, the controller 326 employs a timer 327 to measure the reception time for the A8 packet 186, and records this time in the row 461 and column 455. The controller 326 stores a data fragment 94 in the buffer 113. Further, when the AP 5 receives an A8 packet 187, the controller 326 records control information in the A8 packet in the columns 451, 452, 453 and 454 along the row following the row 461. Further, the controller 326 employs the timer 327 to measure the reception time for the A8 packet 187 and records it in the column 455 in the row following the row 461. The controller 326 stores a data fragment 97 in the buffer 113.

Based on the A8 concatenation flag included in a GRE, etc., the controller 326 determines that the data fragment 94 is a data fragment at the head of the IP packet 80, and while input time 455 recorded in the row 461 is employed as a reference, waits for the arrival of the last data fragment 100 for a predetermined period of time. Assume that, as shown in FIG. 21, since the first data fragment 94 of the IP packet 80 was input to the AP 5, the last data fragment 100 is not input to the AP 5 for a predetermined period of time or longer. And assume that data fragment 97 of the IP packet 80 has currently been received. The controller 326 examines the A8 concatenation flag of the GRE header 452 in the row 461, and determines whether the pertinent data fragment is the last for the IP packet 80. The IP packet can not be reconfigured using only the data fragments 94 and 97. Further, there is a large delay in the transfer of the A8 packet, and even when the AP 5 is waiting for the arrival of the data fragment 100, which includes information, at the tail of the IP packet 80, the delay time for the transmission of the IP packet would be increased. Thus, the AP 5 abandons the data fragments of the IP packet 80.

First, the controller 326 examines the A8 concatenation flag in the GRE header 452 of the stored information management table 450, and searches for data to be abandoned. Beginning with the row following the last row 461, the controller 326 traces backward the A8 concatenation flags to identify the data fragment at the head of the IP packet. Based on the A8 concatenation flag in the row 461, the controller 326 determines that the data fragment 94 is the head of the IP packet 80. And the controller 326 determines that data to be abandoned is a data fragment managed in the rows following the row 461. Thus, the controller 326 abandons information in the area designated from the start address 453 to the end address 454 in each row. The controller 326 of the AP 5 discards, in the buffer 113, the data fragments 94 and 97 that have already been received. Furthermore, in the stored information management table 450, the controller 326 abandons information recorded in the row 461 and the succeeding row, corresponding to the data fragments 94 and 97. In addition, the controller 326 of the AP 5 determines which A10 packets were received before the data fragment 100, at the tail of the IP packet 80, was received, or before the data fragment at the head of the next IP packet was received, and abandons these packets.

In this case, the above described predetermined period of time may be set for individually designated classes. For example, when the TOS is EF, the predetermined period that may be set is the shortest, and when the TOS is AF, the predetermined period that may be set is longer than when the TOS is EF.

EMBODIMENT 12

An additional example packet format prepared by dividing an IP packet is shown in FIG. 22. Reference numeral 400 denotes an A8 packet or an A10 packet; 401, an IP header; 402, a GRE header. Reference numeral 403 denotes an A8 or A10 concatenation flag that is not included in the GRE header. Reference numeral 404 denotes a protocol for data stored in a field 405. Reference numeral 405 denotes a field for storing, for example, a data fragment 352 or a data fragment 353. A protocol field is provided for an IP header to indicate a protocol that is to be stored in an IP packet payload. In a case for the storing of a GRE packet, the PDSN or the PCF that prepares a packet enters a value indicating the GRE packet is to be stored in the protocol field of the IP header.

The format of a GRE packet used for data transmission for the A8 connection or the A10 connection is defined by IETF (The Internet Engineering Task force) RFC2784 or RFC2890. The Protocol Type field is provided for the GRE header, and Protocol Type information indicates a protocol stored in the GRE packet payload. For example, in a case wherein an unstructured byte stream is to be stored in the GRE packet payload, a value in the Protocol Type field is 0x8881. In a case for the employment of the packet format shown in FIG. 22, the A8 or A10 concatenation flag 403, the protocol 404 and the unstructured byte stream 405 are stored in the GRE packet payload. At this time, the PDSN 3 or the PCF 4 that creates a GRE packet sets a value indicating that the A8 or A10 concatenation flag 403, the protocol 404 and the field data 405 are stored in the Protocol Type field of a GRE header 402. Further, the PDSN 3 or the PCF 4 that creates a GRE packet sets, for the protocol 404, a value indicating that the field data 405 is an unstructured byte stream.

EMBODIMENT 13

Another example packet format prepared by dividing an IP packet is shown in FIG. 23. Reference numeral 400 denotes an A8 packet or an A10 packet; 401, an IP header; 402, a GRE header. Reference numeral 403 denotes an A8 or A10 concatenation flag that is not included in the GRE header. Reference numeral 404 denotes a protocol for data stored in a field 405. Reference numeral 405 denotes a field for storing, for example, a data fragment 352 or a data fragment 353. Reference numeral 406 denotes a field for storing a time stamp that is not included in a GRE. For example, in a case for the creation of an A10 packet, the PDSN 3 sets, in the field 406, information for the time at which an IP packet was input to the PDSN 3. Further, for example, in a case wherein the PCF 4 has received an A10 packet and prepares an A8 packet, the PCF 4 copies the field 406 of the A8 packet to the field 407 of the A10 packet.

A protocol field is provided for an IP header to indicate a protocol that is to be stored in an IP packet payload. In a case for the storage of a GRE packet, the PDSN or the PCF that prepares a packet enters a value indicating the storage of a GRE packet in the protocol field of the IP header.

In a case for the employment of the packet format shown in FIG. 23, the A8 or A10 concatenation flag 403, the protocol 404, the time stamp 406 and the unstructured byte stream 405 are stored in the GRE packet payload. At this time, the PDSN 3 or the PCF 4 that creates a GRE packet sets a value indicating that the A8 or A10 concatenation flag 403, the time stamp 406, the protocol 404 and the field data 405 are stored in the Protocol Type field of a GRE header 402. Further, the PDSN 3 or the PCF 4 that creates a GRE packet sets, for the protocol 404, a value indicating that the field data 405 is an unstructured byte stream.

EMBODIMENT 14

Another example packet format prepared by dividing an IP packet is shown in FIG. 24. Reference numeral 400 denotes an A8 packet or an A10 packet; 401, an IP header; 402, a GRE header. Reference numeral 403 denotes an A8 or A10 concatenation flag that is not included in GRE. Reference numeral 406 denotes a field for storing a time stamp that is not included in a GRE. Reference numeral 405 denotes a field for storing, for example, a data fragment 352 or a data fragment 353. For example, in a case for the creation of an A10 packet, the PDSN 3 sets, in the field 406, information for the time at which an IP packet was input to the PDSN 3. Further, for example, in a case wherein the PCF 4 has received an A10 packet and prepares an A8 packet, the PCF 4 copies the field 406 of the A8 packet to the field 407 of the A10 packet.

The format of a GRE packet used for data transmission of the A8 connection or the A10 connection is defined by IETF (The Internet Engineering Task force) RFC2784 or RFC2890. An unused area in a conventional GRE header, for example, may be newly allocated for the A8 or A10 concatenation flag 403 and the time stamp 406. Or, the format of a conventional GRE header may be re-defined, and the A8 or A10 concatenation flag 403 and the time stamp 406 may be provided. A protocol field is provided for an IP header to indicate a protocol that is to be stored in an IP packet payload. In a case for the storage of a GRE packet, the PDSN or the PCF that prepares a packet enters a value indicating the storage of a GRE packet in the protocol field of the IP header.

In a case for the employment of the packet format shown in FIG. 24, the unstructured byte stream 405 is stored in the GRE packet payload. At this time, the PDSN 3 or the PCF 4 that creates a GRE packet sets, in the Protocol Type field of the GRE header 402, a value indicating that the field data 405 is an unstructured byte stream.

EMBODIMENT 15

FIG. 25 shows example packet transmission control for the present invention for performing delay and jitter control. Assume that a timer 254 of a PDSN 3 and a timer 327 of an AP 5 are synchronized with each other using a specific method. For example, the AP 5 and the PDSN 3 may include a GPS receiver, and be synchronized with each other by employing a signal received from a GPS satellite. Or, the AP 5 and the PDSN 3 may employ a protocol, such as the NTP (Network Time Protocol), and exchange messages across a network, shown in FIG. 1, for synchronization.

Suppose that a network interface 255 of the PDSN 3 receives IP packets 420, 421 and 422. The PDSN 3 creates A10 packets by dividing the IP packets, and transmits them to a PCF 4. A controller 252 of the PDSN 3 may prepare PPP frames based on the received IP packets, and divide the PPP frames. For example, assume that the PDSN 3 or the PCF 4 forms A10 packets or A8 packets using the packet format shown in FIG. 24. The packet format shown in FIG. 23 may be employed to form A10 packets or A8 packets. The controller 252 obtains the reception times for the IP packets 420, 421 and 422 by examining counter values held by a timer 254, and sets these times for the time stamps 406 of the A10 packets. For simplification, an explanation will be given for an example wherein the PDSN 3 manages the transmission of A10 packets. However, the management by the PCF of the transmission of A8 packets can be performed in the same manner.

The controller 252 divides the IP packet 420 into data fragments 423 and 424, and prepares A10 packets 473 and 474. The controller 252 sets the reception time for the IP packet 420 a data for the time stamps 406 of the A10 packets 473 and 474. The reception time for the IP packet 420 measured by the PDSN 3 is denoted by a. The data fragment 423 includes the head of the IP packet 420, and does not include the tail of the IP packet 420. Thus, the controller 252 sets to 1 the first bit and sets to 0 the second bit of an A10 concatenation flag 403 of the A10 packet 473. Further, the data fragment 424 does not include the head of the IP packet 420, and does include the tail of the IP packet 420. Thus, the controller 252 sets to 0 the first bit and sets to 1 the second bit of the A10 concatenation flag 403 of the A10 packet 474.

The controller 252 prepares an A10 packet 475 based on the IP packet 421. And the controller 252 sets the reception time for the IP packet 421 for the time stamp 406 of the A10 packet 475. The reception time for the IP packet 421, measured by the PDSN 3, is denoted by b. The data fragment 425 includes the head of the IP packet 420, and also includes the tail of the IP packet 420. Thus, the controller 252 sets to 1 the first bit and the second bit of the A10 concatenation flag 403 of the A10 packet 473.

The controller 252 divides the IP packet 422 into the data fragments 426 and 427, and creates A10 packets 476 and 477, respectively. And the controller 252 sets the reception time for the IP packet 422 to the time stamps 406 of the A10 packets 476 and 477. The reception time for the IP packet 422 measured by the PDSN 3 is denoted by c. The data fragment 426 includes the head of the IP packet 422, and does not include the tail of the IP packet 422. Thus, the controller 252 sets to 1 the first bit and sets to 0 the second bit of the A10 concatenation flag 403 of the A10 packet 476. The data fragment 427 does not include the head of the IP packet 422, and includes the tail of the IP packet 422. Thus, the controller 252 sets to 0 the first bit and sets to 1 the second bit of the A10 concatenation flag 403 of the A10 packet 477.

A network interface 306 of the PCF 4 receives the A10 packets. The received data fragments and control information are stored in a storage unit 307. The PCF 4 performs interface conversion from A10 to A8. That is, a CPU 308 of the PCF 4 creates an A8 packet 473 by replacing the IP header 501 and a GRE header 502 of the A10 packet 473. For the A10 packet 474, the CPU 308 of the PCF 4 replaces an IP header 503 and a GRE header 504, and creates an A8 packet 474. For the A10 packet 475, the CPU 308 of the PCF 4 replaces an IP header 505 and a GRE header 506, and creates an A8 packet 475. For the A10 packet 476, the CPU 308 of the PCF 4 replaces an IP header 507 and a GRE header 508, and creates an A8 packet 476. For the A10 packet 477, the CPU 308 of the PCF 4 replaces an IP header 509 and a GRE header 510, and creates an A8 packet 477. It should be noted that for an A10 packet and an A8 packet obtained by converting the A10 packet, the same information is indicated by the A10 or A8 concatenation flag 403 and the time stamp 406. Further, in a case wherein an A10 packet is divided into more segments to form A8 packets, it should be noted that the same information is present in the time stamps 406 of these A8 packets. The PCF 4 transmits the A8 packets 473, 474, 475, 476 and 477 to the AP 5 through the network interface 301.

A network interface 320 of the AP 5 receives the A8 packets 473, 474, 475, 476 and 477. When the AP 5 receives the A8 packets, a controller 326 records control information for the A8 packets in a stored information management table 450. The controller 326 writes, in a column 451, the IP headers of the A8 packets received by the AP 5. The controller 326 writes, in a column 452, the GRE headers that each include the A8 concatenation flag 403 and the time stamp 406. Further, the controller 326 writes, in a column 452, start addresses in the buffer 113 at which data fragments of the A8 packets received by the AP 5 are stored. Furthermore, the controller 326 writes, in a column 453, end addresses in the buffer 113 at which data fragments of the A8 packets received by the AP 5 are stored. The controller 326 also writes, in a column 455, the reception times for the A8 packets that the AP 5 received. At this time, the time is measured by the timer 327 of the AP 5. Additionally, the controller 326 stores, in the buffer 113, defined as an area in the storage unit 325, the data fragments 423, 424, 425 and 427 of the received A8 packets. Moreover, the controller 326 creates an RLP packet by employing the A8 concatenation flag 403 and the time stamp 406 that are recorded in the management table 450, and controls the timing for the transmission of the RLP packet.

The controller 326 prepares an RLP packet 430 based on the data fragments 423 and 424 of the IP packet 420. The controller 326 may add padding 433 to the RLP packet 430 to adjust the length, so that the RLP packet satisfies the length specified by the protocol. The controller 326 forms an RLP packet 431 based on the data fragment 425 of the IP packet 431. The controller 326 may add padding 434 to the RLP packet to adjust the length. Further, the controller 326 forms an RLP packet 432 based on the data fragments 426 and 427 of the IP packet 432. The controller 326 may add padding 435 to the RLP packet to adjust the length. Or, a data fragment may be added, instead of the padding 433, 434 or 435. For example, data consisting of an IP packet in the best effort class that is tolerant of delays or jitter may be added.

The controller 326 provides control so as to transmit the RLP packet 430 at a time aa, transmit the RLP packet 431 at a time bb and transmit the RLP packet 432 at a time cc. When a predetermined delay period is D, aa is represented as time by adding D to a, bb is represented as time by adding D to b, and cc is represented as time by adding D to c. The controller 326 examines the time stamp 406, which is included in the GRE header 452 of the management table 450, and detects time a, b and c. The controller 326 adds D, while controlling a period of time wherein the RLP packet, or information consisting of the RLP packet, is present in the storage unit 325. As described above, the timer 254 of the PDSN 3 and the timer 327 of the AP 5 are synchronized. The controller 326 of the AP 5 provides control for transmitting a wireless packet at a time that is delayed by D from the time measured by the timer 327. The AP 5 creates a radio signal based on the RLP packet, and transmits this signal through an antenna 328.

The controller 326 provides control, in order to transmit the RLP packet 430 at time aa, the RLP packet 431 at time bb and the RLP packet at time cc, as exactly as possible. For example, assume that data having a priority level higher than designated by the TOS of the IP packet 420, stored in the RLP packet, is present in the storage unit 325 of the AP 5. At this time, the controller 326 gives priority to the transmission of data having a higher priority level than the IP packet 420, and it is acceptable, as a result, for the transmission of the RLP packet 430 to be delayed, not performed at time aa. Further, in a case wherein the timing for the transmission of the RLP packet 430 is quantized as a slot, the controller 326 may transmit the RLP packet at a slot as close to time cc as possible.

EMBODIMENT 16

FIG. 29 shows another example packet transmission control for the present invention for performing delay and jitter control. Assume that a timer 254 for a PDSN 3 and a timer 327 for an AP 5 are synchronized with each other using a specific method. For example, the AP 5 and the PDSN 3 may include a GPS receiver, and be synchronized with each other by employing a signal received from a GPS satellite. Or, the AP 5 and the PDSN 3 may employ a protocol, such as the NTP (Network Time Protocol), and exchange messages across a network shown in FIG. 1 for synchronization. In a case wherein there are a plurality of MSs with which the AP 5 communicates, the AP can provide transmission control for each IP packet unit, through allocation control, (scheduling) for a period for communication with each MS.

Suppose that a network interface 255 of the PDSN 3 receives IP packets 620, 621 and 622. Assume that the IP packet 620 is addressed to an MS 8 and the IP packets 621 and 622 are addressed to an MS 340. The PDSN 3 creates A10 packets, by dividing the IP packets, and transmits them to a PCF 4. A controller 252 of the PDSN 3 may prepare PPP frames, based on the received IP packets, and divide the PPP frames. For example, assume that the PDSN 3 or the PCF 4 forms A10 packets or A8 packets using the packet format shown in FIG. 24. The controller 252 obtains the reception times for the IP packets 620, 621 and 622 by examining counter values held by a timer 254, and sets these times for the time stamps 406 of the A10 packets. For simplification, an explanation will be given for an example wherein the PDSN 3 manages the transmission of A10 packets. However, management by the PCF of for the transmission of A8 packets can be performed in the same manner.

The controller 252 divides the IP packet 620 into data fragments 623 and 624 and prepares A10 packets 673 and 674. The controller 252 sets the reception time for the IP packet 620 for the time stamps 406 of the A10 packets 673 and 674. The reception time for the IP packet 620 measured by the PDSN 3 is denoted by a. The data fragment 623 includes the head of the IP packet 620 and does not include the tail of the IP packet 620. Thus, the controller 252 sets to 1 the first bit and sets to 0 the second bit of an A10 concatenation flag 403 of the A10 packet 673. Further, the data fragment 624 does not include the head of the IP packet 620, and does include the tail of the IP packet 620. Thus, the controller 252 sets to 0 the first bit and sets to 1 the second bit of the A10 concatenation flag 403 of the A10 packet 674.

The controller 252 prepares an A10 packet 675 based on the IP packet 621. And the controller 252 sets the reception time for the IP packet 621 for the time stamp 406 of the A10 packet 675. The reception time for the IP packet 621 measured by the PDSN 3 is denoted by b. The data fragment 625 includes the head of the IP packet 620, and also includes the tail of the IP packet 620. Thus, the controller 252 sets to 1 the first bit and the second bit of the A10 concatenation flag 403 of the A10 packet 673.

The controller 252 divides the IP packet 622 into the data fragments 626 and 627, and creates A10 packets 676 and 677, respectively. And the controller 252 sets the reception time for the IP packet 622 for the time stamps 406 of the A10 packets 676 and 677. The reception time for the IP packet 622 measured by the PDSN 3 is denoted by c. The data fragment 626 includes the head of the IP packet 622, and does not include the tail of the IP packet 622. Thus, the controller 252 sets to 1 the first bit and sets to 0 the second bit of the A10 concatenation flag 403 of the A10 packet 676. The data fragment 627 does not include the head of the IP packet 622, and includes the tail of the IP packet 622. Thus, the controller 252 sets to 0 the first bit and sets to 1 the second bit of the A10 concatenation flag 403 of the A10 packet 677.

A network interface 306 of the PCF 4 receives the A10 packets. The received data fragments and control information are stored in a storage unit 307. The PCF 4 performs an interface conversion from A10 to A8. That is, a CPU 308 of the PCF 4 creates an A8 packet 673 by replacing the IP header 641 and a GRE header 642 of the A10 packet 673. For the A10 packet 674, the CPU 308 of the PCF 4 replaces an IP header 643 and a GRE header 644, and creates an A8 packet 674. For the A10 packet 675, the CPU 308 of the PCF 4 replaces an IP header 645 and a GRE header 646, and creates an A8 packet 675. For the A10 packet 676, the CPU 308 of the PCF 4 replaces an IP header 647 and a GRE header 648, and creates an A8 packet 676. For the A10 packet 677, the CPU 308 of the PCF 4 replaces an IP header 649 and a GRE header 670, and creates an A8 packet 677. It should be noted that, for an A10 packet and an A8 packet obtained by converting the A10 packet, the same information is indicated by the A10 or A8 concatenation flag 403 and the time stamp 406. Further, in a case wherein an A10 packet is divided into more segments to form A8 packets, it should be noted that the same information is present in the time stamps 406 of these A8 packets. The PCF 4 transmits the A8 packets 673, 674, 675, 676 and 677 to the AP 5 through the network interface 301. The AP 5 examines the GRE headers of the received A8 packets, and determines the destinations of the A8 packets. For the individual destinations, the controller 326 of the AP 5 stores the A8 packets in the reception buffer of the storage unit 325.

A network interface 320 of the AP 5 receives the A8 packets 673, 674, 675, 676 and 677. Buffers in the storage unit 325 for holding received information are shown in FIG. 30. The controller 326 of the AP 5 examines control information for the A8 packet, and stores the data fragments 623 and 624 in a buffer 651 for the MS 8. And the controller 326 of the AP 5 examines control information for the A8 packet, and stores the data fragments 625, 626 and 627 in a buffer 652 for the MS 340.

When the AP 5 receives the A8 packets, the controller 326 records the control information for the A8 packets in stored information management tables 653 and 654 in the storage unit 325. An example for the stored information management tables 653 and 654 is shown in FIG. 31. The controller 326 records information for the MS 8 in the stored information management table 653, and records information for the MS 340 in the stored information management table 654.

The controller 326 writes, in a column 661, the IP headers 641 and 643 of the A8 packets 673 and 674 received by the AP 5. And the controller 326 writes, in a column 662, the GRE headers 642 and 644 that each include the A8 concatenation flag 403 and the time stamp 406. Further, the controller 326 writes, in a column 663, start addresses in the buffer 651 at which data fragments of the A8 packets received by the AP 5 are stored. Furthermore, the controller 326 writes, in a column 664, end addresses, in the buffer 651, at which data fragments of the A8 packets received by the AP 5 are stored. The controller 326 also writes, in a column 665, reception times for the A8 packets that the AP 5 received. At this time, the time is measured by the timer 327 of the AP 5. The controller 326 records, in a row 680, control information for the A8 packet 673. Further, the controller 326 records, in a row 681, the control information for the A8 packet 674.

The controller 326 writes, in a column 671, the IP headers 645, 647 and 649 of the A8 packets 675, 676 and 677 received by the AP 5. And the controller 326 writes, in a column 672, the GRE headers 646, 648 and 650 that each include the A8 concatenation flag 403 and the time stamp 406. Further, the controller 326 writes, in a column 673, start addresses, in the buffer 652, at which data fragments of the A8 packets received by the AP 5 are stored. Furthermore, the controller 326 writes, in a column 674, end addresses, in the buffer 652, at which data fragments of the A8 packets received by the AP 5 are stored. The controller 326 also writes, in a column 675, reception times for the A8 packets that the AP 5 received. At this time, the time is measured by the timer 327 of the AP 5. The controller 326 records, in a row 684, control information for the A8 packet 675. Further, the controller 326 records, in a row 685, the control information for the A8 packet 676. Also, the controller 326 records, in a row 686, the control information for the A8 packet 686.

According to conventional scheduling, the MS 8 and the MS 340 transmit a DRC to the AP 5. The AP 5 receives a DRC, and the controller 326 of the AP 5 calculates DRC/R for the MS 8 and the MS 340. The controller 326 creates an RLP packet by using information addressed to a mobile station having the largest DRC/R, and transmits the RLP packet. On the other hand, scheduling for this invention is performed as follows.

Example scheduling while taking into account the delay time for an IP packet will now be described. In this example, in accordance with the time elapsed since the input time at which the information to be transmitted was input to the PDSN 3, the controller 326 of the AP 5 performs scheduling to increase the priority level of the information to be transmitted. For example, the controller 326 calculates expression 1 for each mobile station, the MS 8 and the MS 340.
[Expression 1]

$$\left(\frac{DRC}{R}\right)_i f(t - t_{PDSN})  \quad \text{Expression 1}$$

The controller 326 employs information addressed to a mobile station for which the result in expression 1 is the maximum, and creates and transmits an RLP packet. In this case, (DRC/R)i is DRC/R, about MSi. For example, according to the system shown in FIG. 1, i is 8 or 340. f denotes a correction function, and t denotes the time indicated by the timer 327. $t_{PDSN}$ denotes the oldest time of the times at which IP packets, including data fragments that are held in the storage unit 325 and are addressed to the mobile station, were input to the PDSN 3. In FIGS. 29, 30 and 31, $t_{PDSN}$ for the MS 8, for example, is time a, and $t_{PDSN}$ for the MS 340 is time b. By examining the management tables 653 and 654, the AP 5 can detect the time at which the IP packet, including data fragments that are held in the storage unit 325 and are addressed to the mobile station, was input to the PDSN 3. Expression 1 is a general expression, and instead of expression 1, expression 2, for example, may be employed.
[Expression 2]

$$\left(\frac{DRC}{R}\right)_i [\alpha + \beta(t - t_{PDSN})]  \quad \text{Expression 2}$$

In expression 2, α and β are regarded as positive constants. According to expression 2, when time elapses while a data fragment addressed to the mobile station is held in the storage unit 325, a value for correction function [α+β(t−$t_{PDSN}$)] is increased. As a result, a transmission period is easily allocated for this mobile station, and a delay in the transmission of the data fragment can be reduced.

Example scheduling performed during a period 602 is shown in FIG. 29. According to the conventional scheduling method, as shown in FIG. 28, because of the value of DRC/R, the entire period 602 is allocated as a period for transmissions to the MS 340.

According to the control performed in this invention, at time aaa, the controller 326 calculates (DRC/R)$_8$[α+β(aaa−a)] for the MS 8, and (DRC/R)$_{340}$[(α+β(aaa−b)] for the MS 340, and compares the two values. Assume that (DRC/R)$_{340}$[α+β(aaa−b)] is greater than (DRC/R)$_8$[α+β(aaa−a)]. The controller 326 forms the RLP packet 631, based on the data segment 625 addressed to the MS 340, and transmits it along a ratio transmission path. The controller 326 employs the data segments 626 and 627 to overwrite the data segment 625 in the buffer 652 that has been transmitted. Further, in the management table 654, the controller 326 employs information in the row 685 to overwrite the row 684 whereat the information that has been transmitted is recorded, and further, employs information in the row 686 to overwrite the row 685. Furthermore, the controller 326 updates the start address 673 and the end address 674.

At time bbb, the controller 326 calculates (DRC/R)$_8$[α+β(bbb−a)] for the MS 8, and (DRC/R)$_{340}$[α+β(bbb−c)] for the MS 340, and compares the two values. Assume that (DRC/R)$_8$[α+β(bbb−a)] is greater than (DRC/R)$_{340}$[α+β(bbb−b)].

The controller 326 forms the RLP packet 630 based on the data segments 623 and 624 addressed to the MS 8, and transmits it along a ratio transmission path. The controller 326 abandons the data segments 623 and 624 in the buffer 651 that have been transmitted. When the controller 326 receives an A8 packet including data addressed to the MS 8, the controller 326 stores data fragments beginning from the left in FIG. 30. Further, the controller 326 abandons information in the management table 653.

EMBODIMENT 17

FIG. 27 shows another example wherein a PDSN 3 stores, in information obtained by dividing an IP packet, information indicating a break between IP packets. Depending on some protocol for the PDSN 3, there is a case wherein a frame is created based on an IP packet, and A10 packets are formed by dividing this frame. In order to add control information to the head or the tail of the frame, the PDSN or the PCF may prepare an A10 packet or an A8 packet that does not include the original IP packet. At this time, each A10 or A8 concatenation flag represents the head or the tail of a frame that includes one IP packet. An example will be explained below.

Assume that a network interface 255 for the PDSN 3 receives an IP packet 550. A controller 252 holds received information in a storage unit 251, and disassembles or assembles a packet. The controller 252 of the PDSN 3 prepares a PPP packet 551 by adding control information 562 to the IP packet 550, and further creates frames 84 and 85. The controller 252 adds control information 563 to the head of the PPP packet 551 and adds the control information 564 to the tail, thereby preparing a frame 552.

The controller 252 of the PDSN 3 divides the frame 552 into data fragments 573, 576, . . . and 579, and forms A10 packets 555, 556, . . . and 557, respectively.

At this time, the controller 252 adds an IP header 571 and a GRE header 572 to the data fragment 573. Further, the controller 252 adds an IP header 574 and a GRE header 575 to the data fragment 576. Also, the controller 252 adds an IP header 577 and a GRE header 578 to the data fragment 579. As shown in FIG. 27, the data fragment of the A10 packet 555 includes information at the head of the frame 552, and does not include information at the head of the IP packet 550 received by the PDSN 3. The data fragment of the A10 packet 557 includes information at the tail of the frame 552, and does not include information at the tail of the IP packet 550 received by the PDSN 3.

In this case, as fields for storing information that indicates a break between frames for each IP packet, A10 concatenation flags 581, 582, . . . 583 are provided for the GRE headers of the A10 packets 555, 556, . . . and 557, respectively. The A10 concatenation flag consists of two bits. When a data fragment is information at the head of the frame 552, the first bit is 1, and when it is not, the first bit is 0. When a data fragment is information at the tail of the frame 552, the second bit is 1, and when it is not, the second bit is 0. For the A10 concatenation flags in the drawing, the first bit is shown on the left and the second bit is shown on the right. In this embodiment, the field for the A10 concatenation flag is provided by re-defining a conventional GRE header. For example, a field for an A10 concatenation flag may be provided for an area (Reserved area) not used for controlling a conventional GRE header.

The data fragment 573 includes information at the head of the IP packet 550, and does not include information at the tail of the IP packet 550. Therefore, the controller 252 sets to 1 the first bit and sets to 0 the second bit of the A10 concatenation flag 581 to be added to the data fragment 573. The data fragment 576 does not include either information at the head of the frame 552 or information at the tail of the frame 552. Therefore, the controller 252 sets to 0 the first bit and the second bit of the A10 concatenation flag 582 to be added to the data fragment 576. The data fragment 579 does not include information at the head of the frame 552, and includes information at the tail of the frame 552. Thus, the controller 252 sets to 0 the first bit and sets to 1 the second bit of the A10 concatenation flag 583 to be added to the data fragment 579.

The PDSN 3 transmits an A10 packet through a network interface 250 in an order that maintains the arrangement of the information in the frame 552. For example, for the frame 552, the PDSN 3 first transmits the A10 packet 555 that includes information at the head of the frame 552. Then, the PDSN 3 transmits the A10 packet 556. Finally, the PDSN 3 transmits the A10 packet 557 that includes information at the tail of the frame 552. The PCF 4 and the AP 5 handle the A8 or A10 concatenation flag in exactly the same manner as in the above examples. As a result, the PCF 4 and the AP 5 provide control by the unit of the frame 552 created based on an IP packet, instead of the unit of the IP packet 550.

Further, for example, assume that the PDSN 3 forms A10 packets using the format shown in FIG. 24. At this time, the PDSN 3 sets, for the time stamps 406 of the A10 packets 555, 556, . . . and 557, the time for the reception of the IP packet 550.

For the invention according to the present application, a packet format described below is included in the scope of the invention.

A transmission packet, to be transmitted by the PDSN 3 or the PCF 4, wherein a GRE header is provided following an IP header, characterized in that:

the GRE header includes a concatenation flag that indicates whether the transmission packet includes a data fragment corresponding to the head or the tail of a reception packet received by the PDSN.

A transmission packet characterized in that, in addition to the concatenation flag, information indicating the reception time, at which the packet was received by the PDSN, is included in the GRE header of the above described transmission packet.

A transmission packet, to be transmitted by the PDSN 3 or the PCF 4, wherein a GRE header is provided following an IP header, characterized by providing, following the GRE header, fields for entering a concatenation flag that indicates whether the transmission packet includes a data fragment corresponding to the head or the tail of a reception packet received by the PDSN, and a protocol indicator that represents a protocol for information to be stored in the packet.

The above described transmission packet is characterized by further providing:

a field for entering information for the reception time at which the packet was received by the PDSN.

Figure 1:
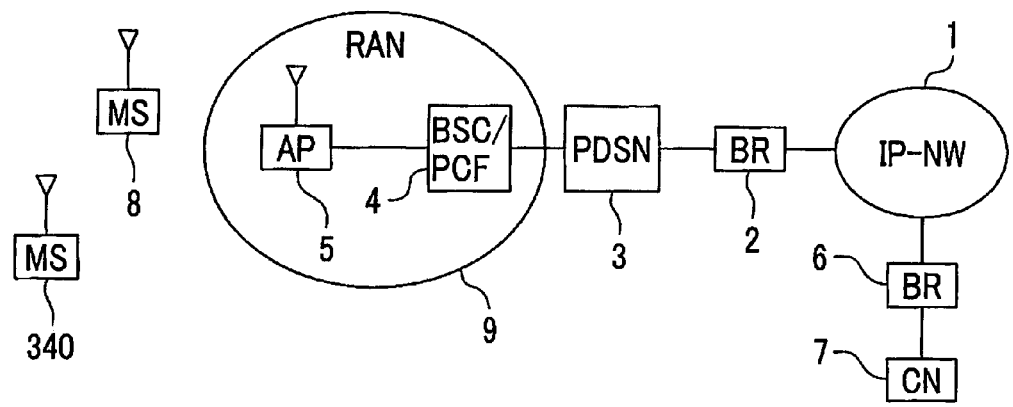
[FIG. 1] An example network configuration
[FIG. 2] Example data flow
[FIG. 3] Example packet format
[FIG. 4] Example packet format
[FIG. 5] Example format for a radio transmission unit
[FIG. 6] Example format for a radio transmission unit
[FIG. 7] Example IP packet division processing
[FIG. 8] Example packet format for the present invention
[FIG. 9] Example packet format for the present invention
[FIG. 10] Example packet format for the present invention
[FIG. 11] Example PDSN for the present invention
[FIG. 12] Example PCF for the present invention
[FIG. 13] Example traffic controller for the present invention
[FIG. 14] Example AP for the present invention
[FIG. 15] Example transmission queue buffer for the present invention
[FIG. 16] Example transmission queue buffer for the present invention
[FIG. 17] Example stored information management table for the present invention
[FIG. 18] Example transmission queue buffer for the present invention
[FIG. 19] Example packet format for the present invention
[FIG. 20] Example packet format for the present invention
[FIG. 21] Example transmission queue buffer for the present invention
[FIG. 22] Example packet format for the present invention
[FIG. 23] Example packet format for the present invention
[FIG. 24] Example packet format for the present invention
[FIG. 25] Example packet transmission control for the present invention
[FIG. 26] Example format for a radio transmission unit
[FIG. 27] Example packet format for the present invention
[FIG. 28] Example transmission scheduling performed by an AP
[FIG. 29] Example packet transmission control for the present invention
[FIG. 30] Example transmission queue buffer for the present invention
[FIG. 31] Example stored information management table for the present invention
Figure 2:
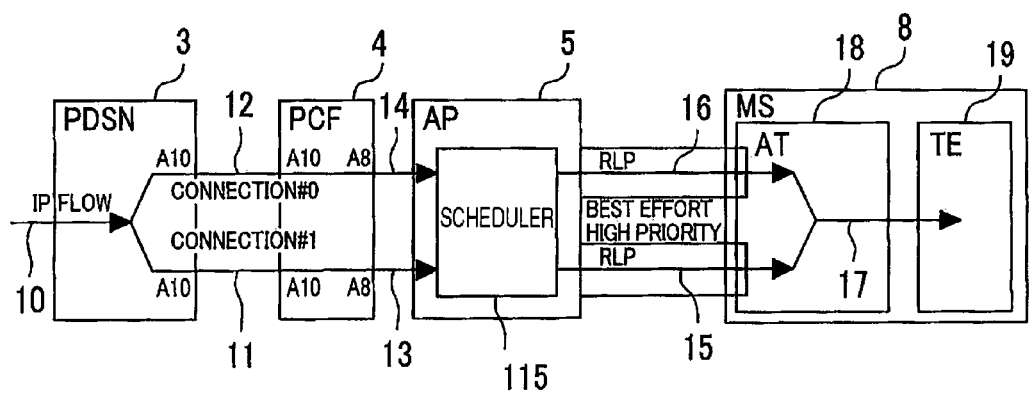
Figure 3:
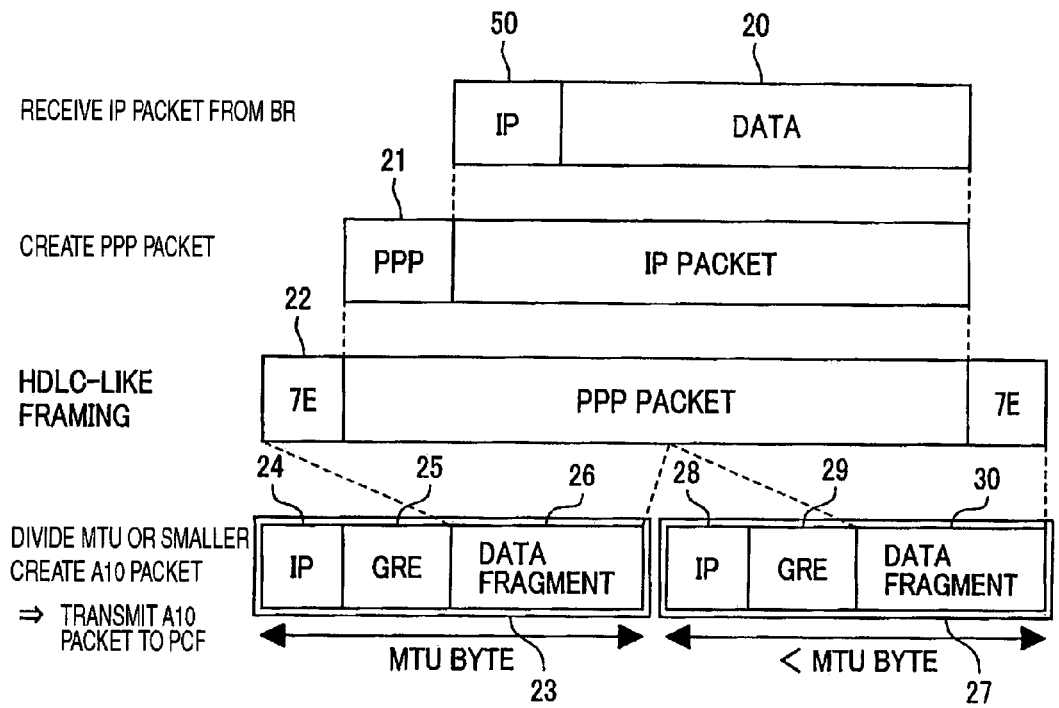
Figure 4:
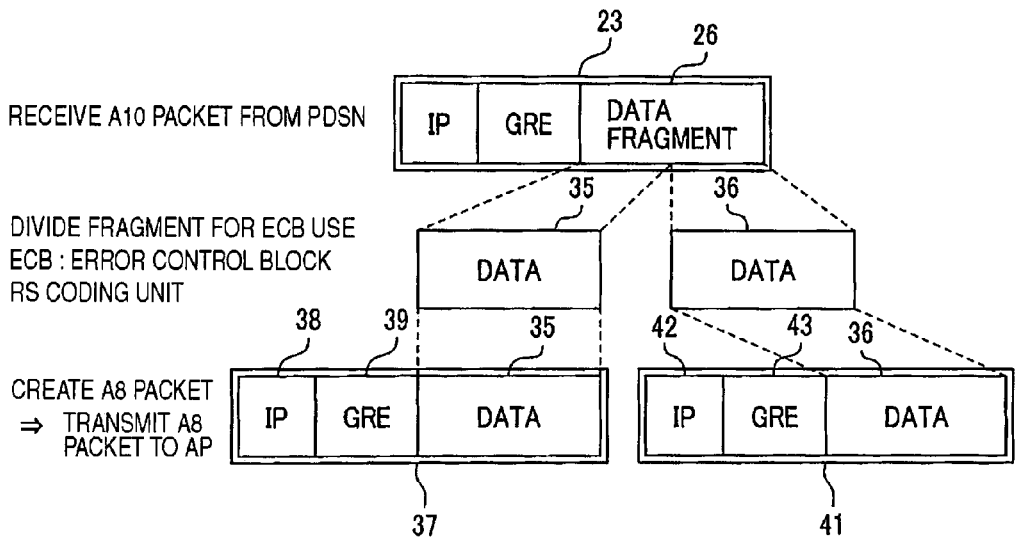
Figure 5:
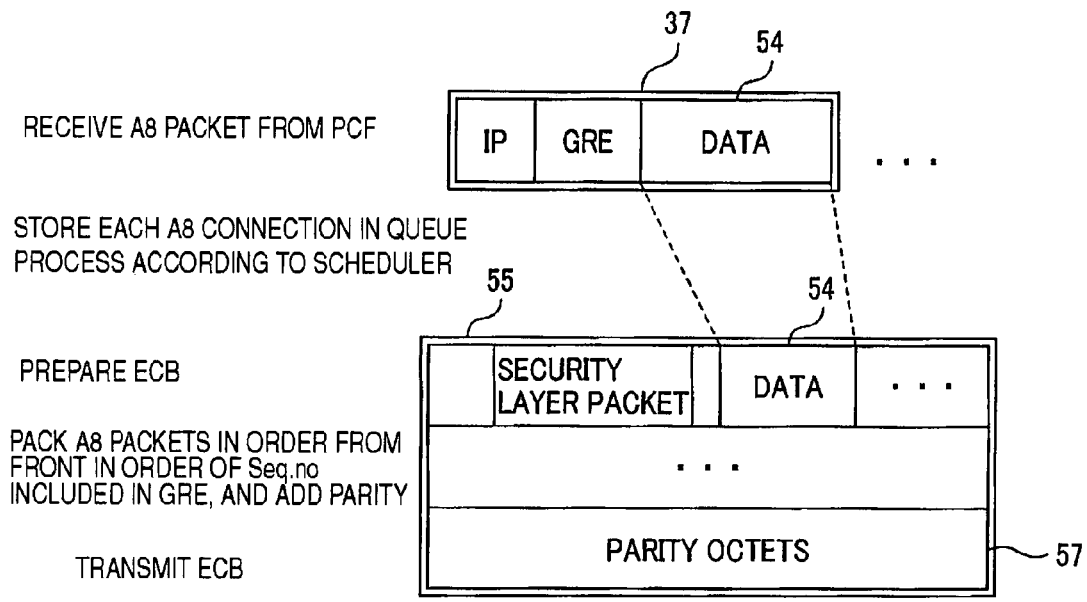
Figure 6:
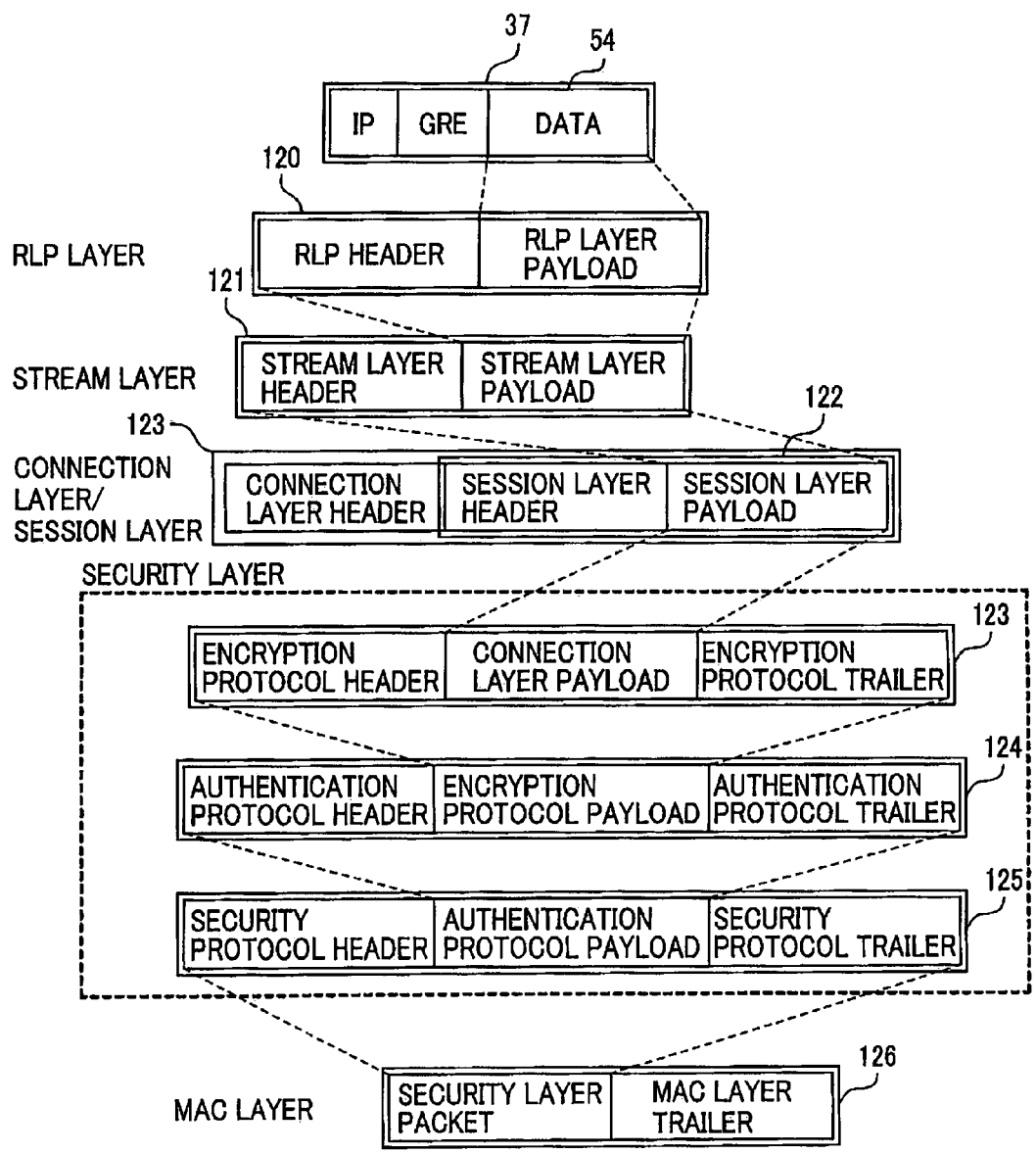
Figure 7:
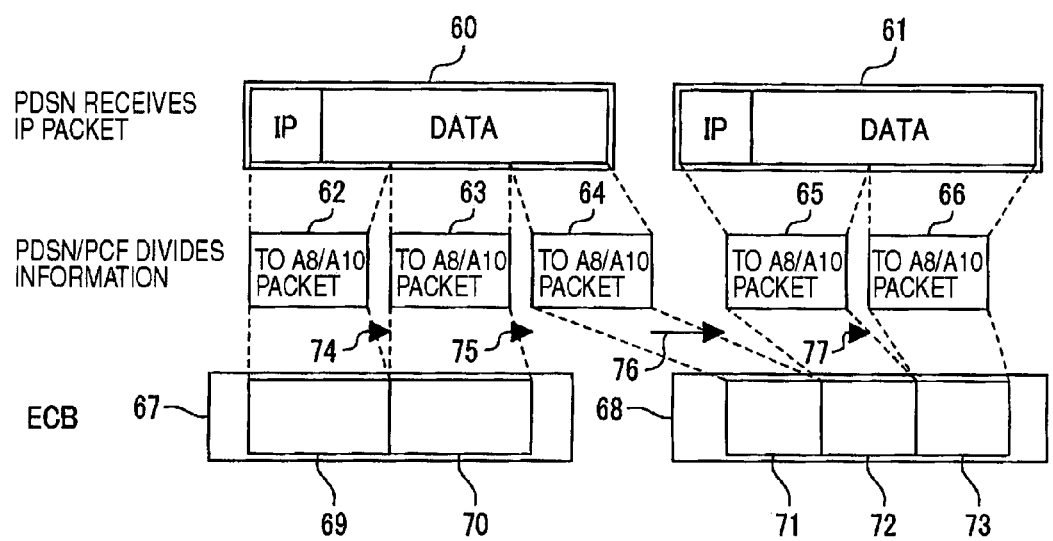
Figure 8:
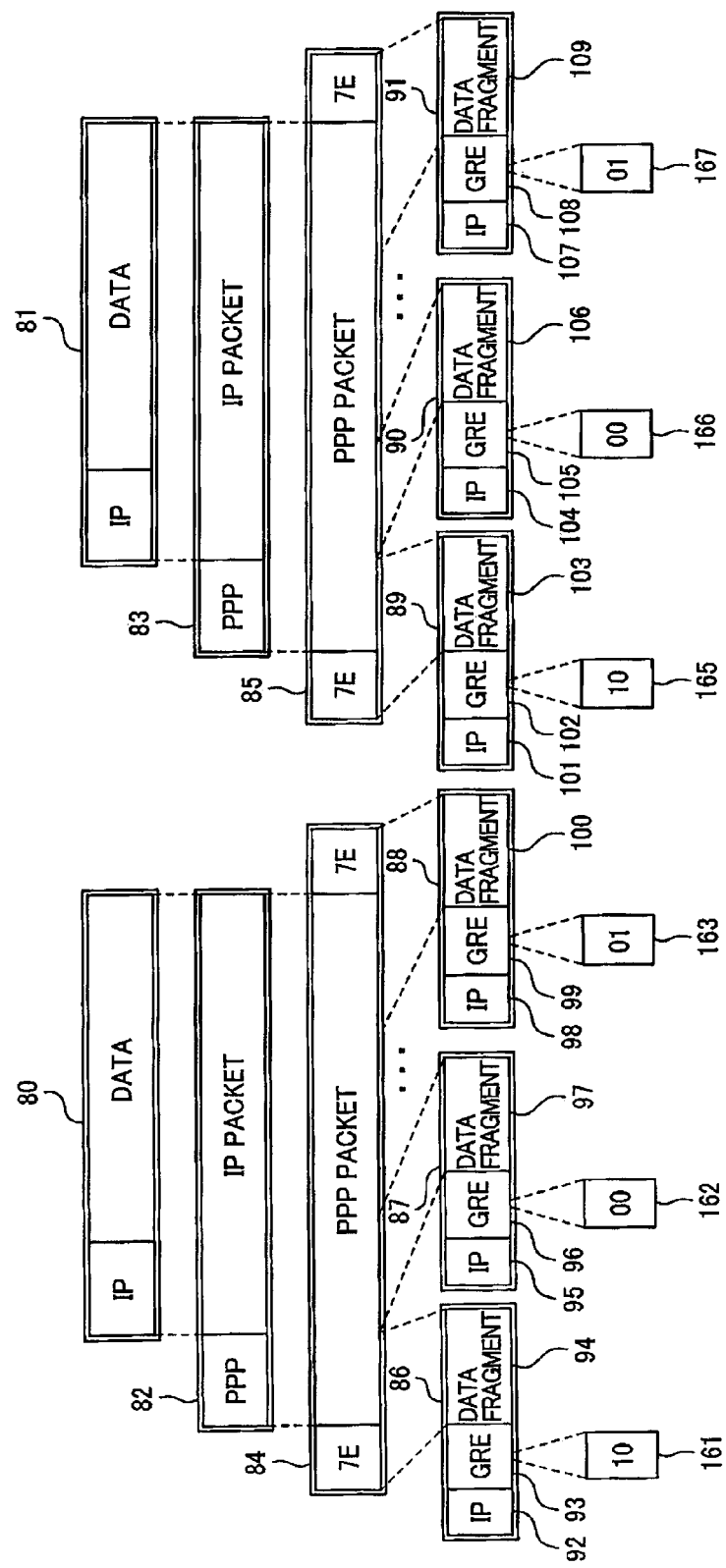
Figure 9:
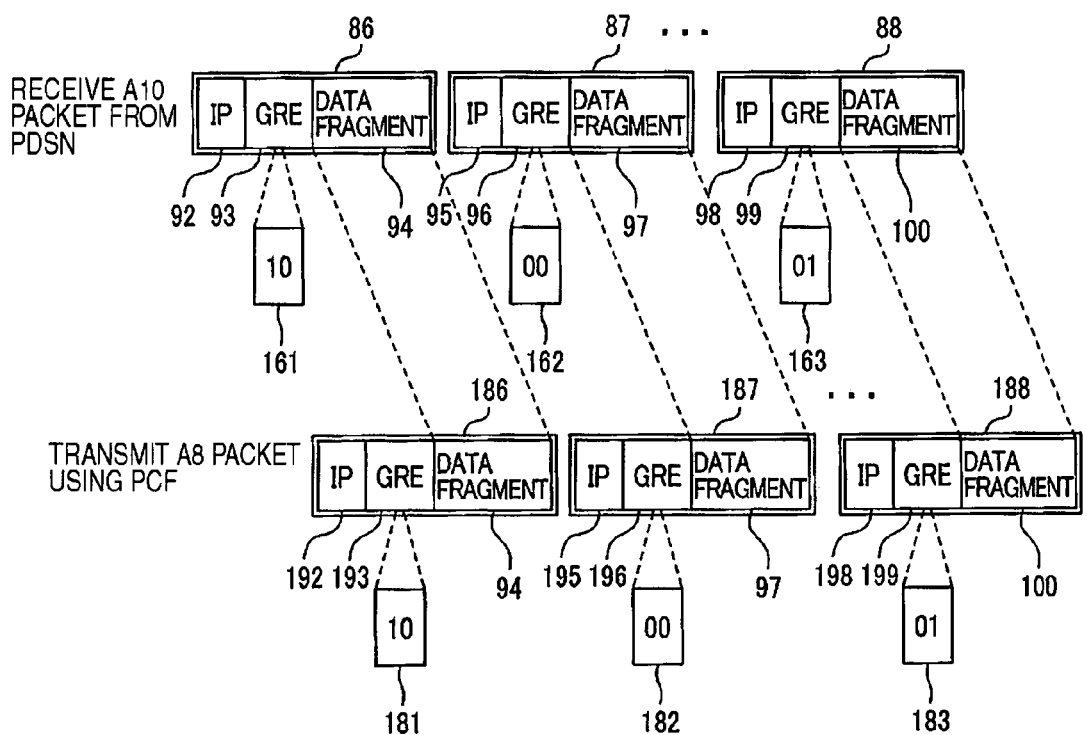
Figure 10:
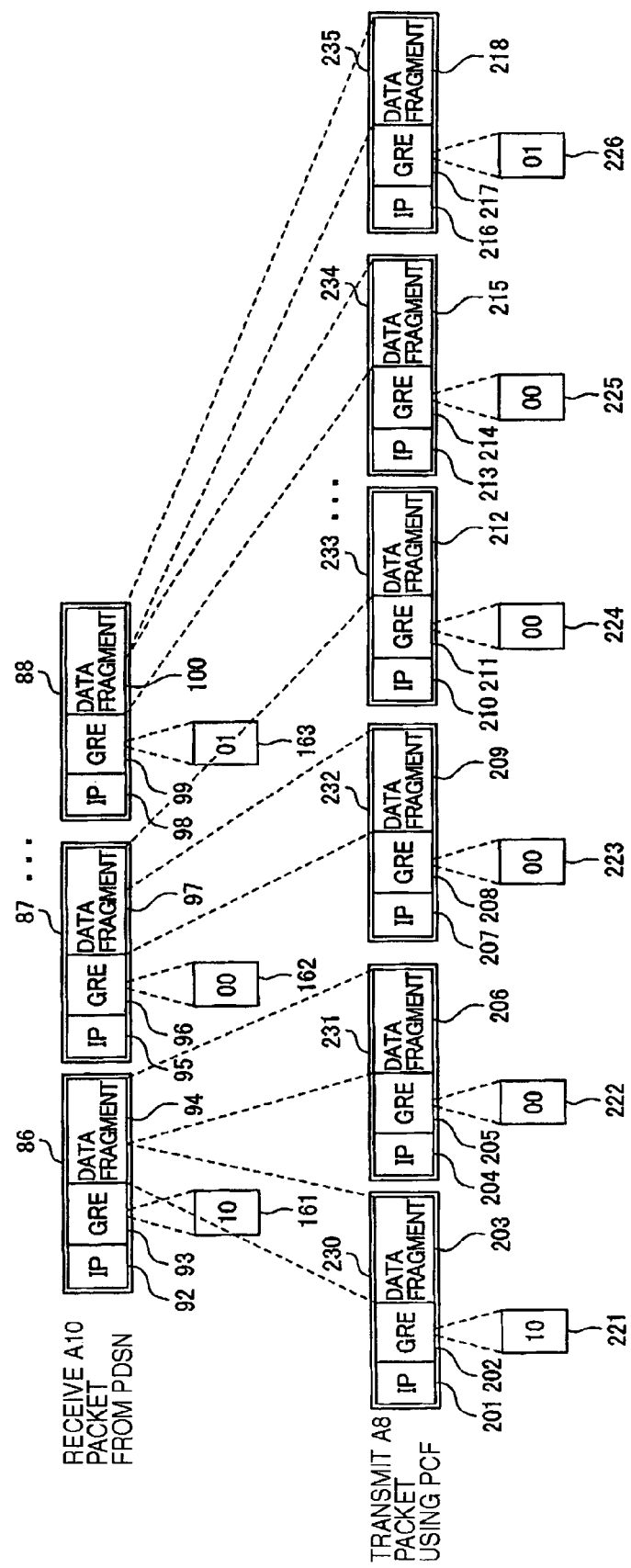
Figure 11:
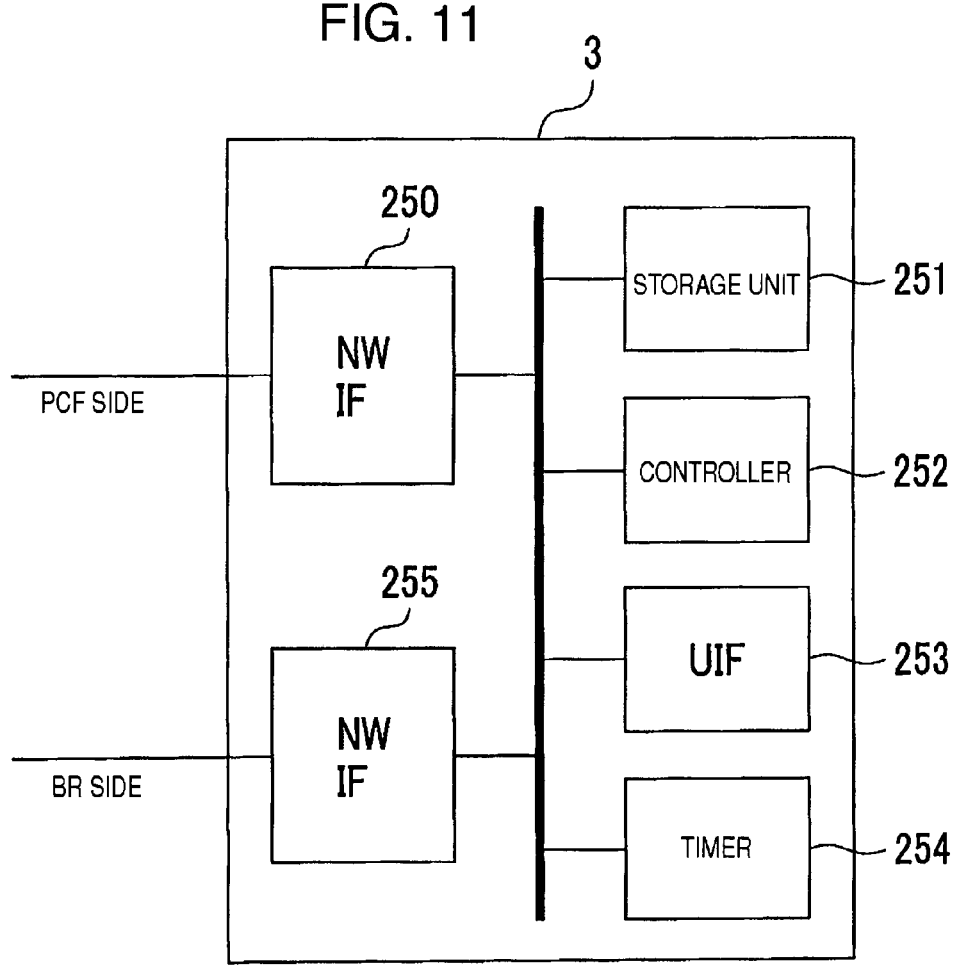
Figure 12:
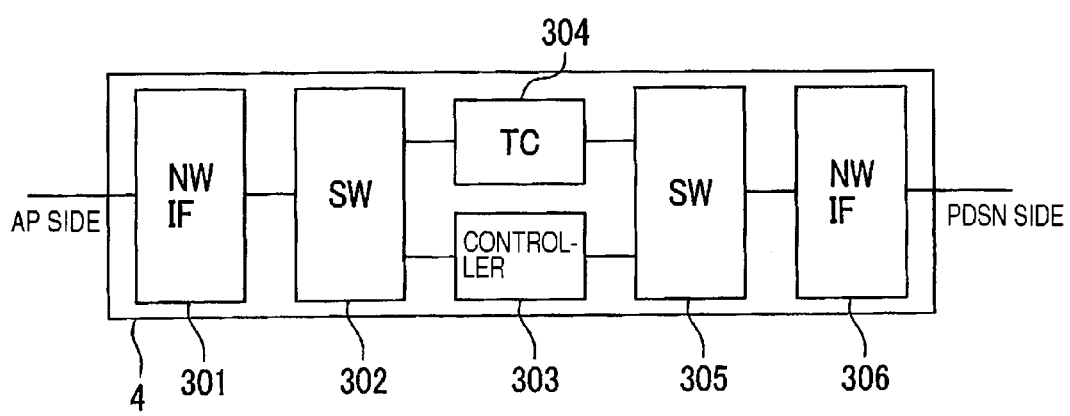
Figure 13:
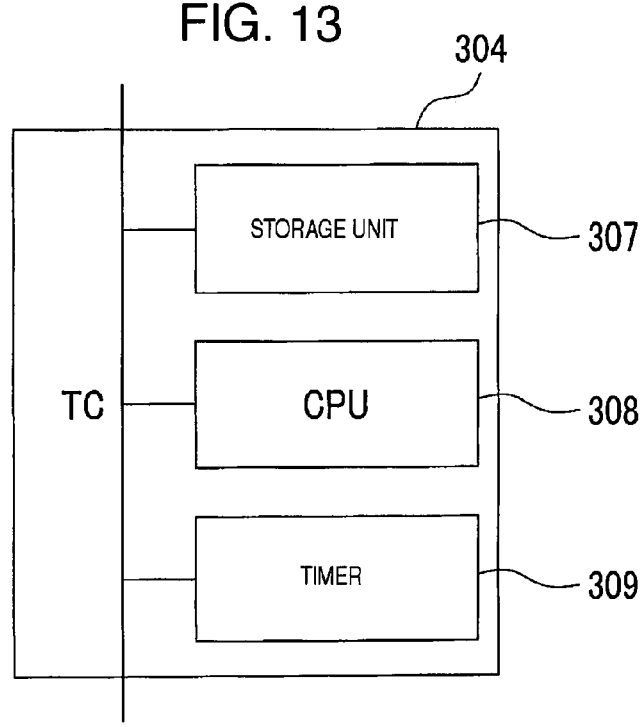
Figure 14:
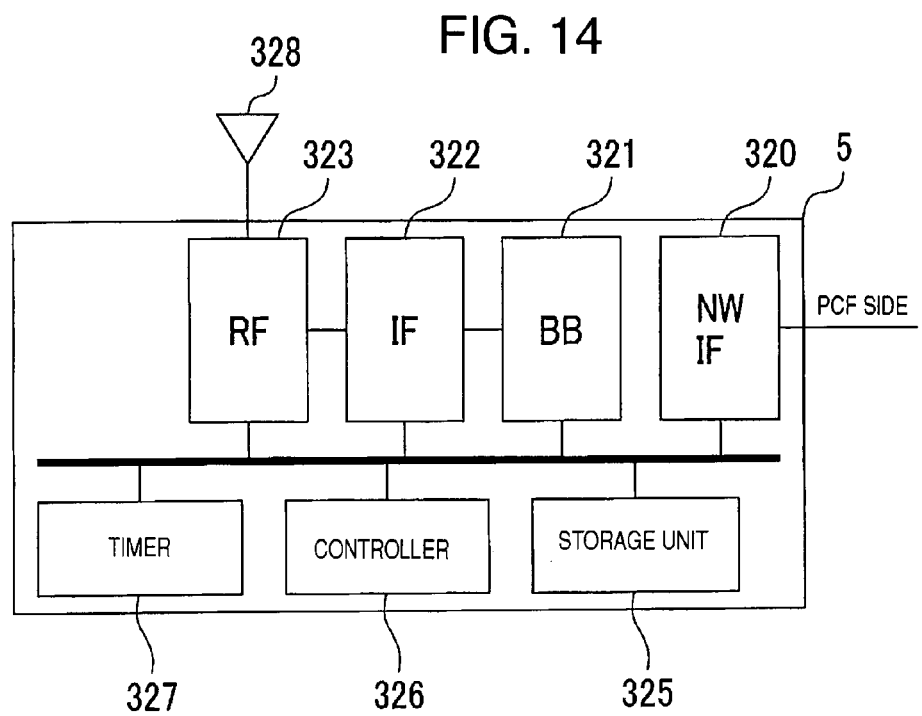
Figure 15:
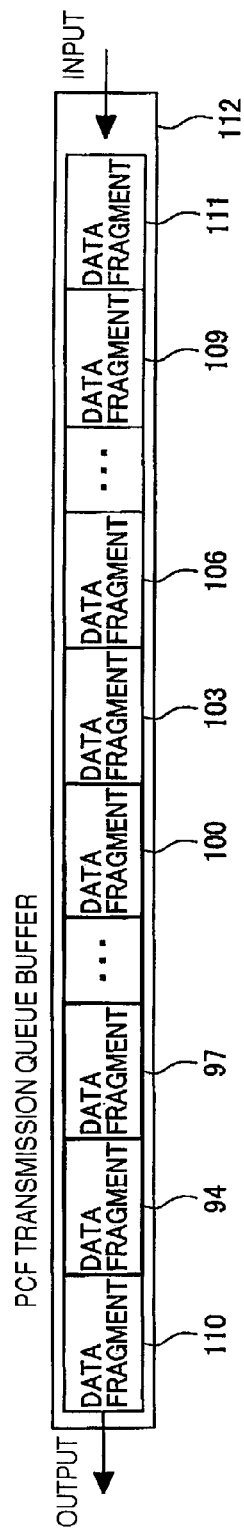
Figure 16:
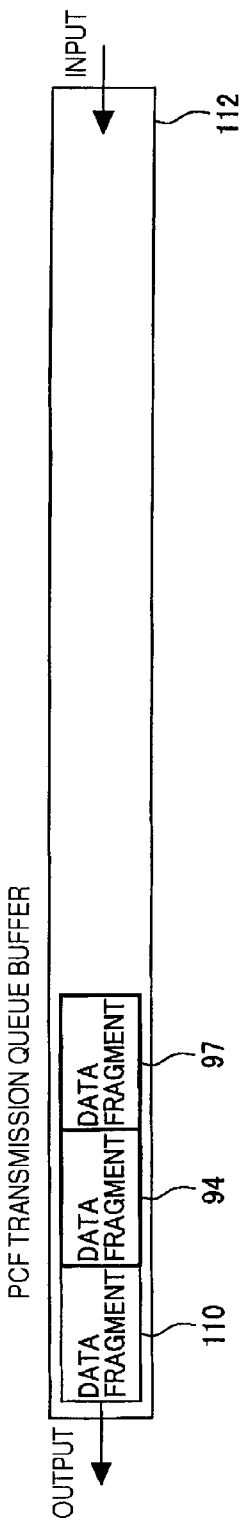
Figure 17:
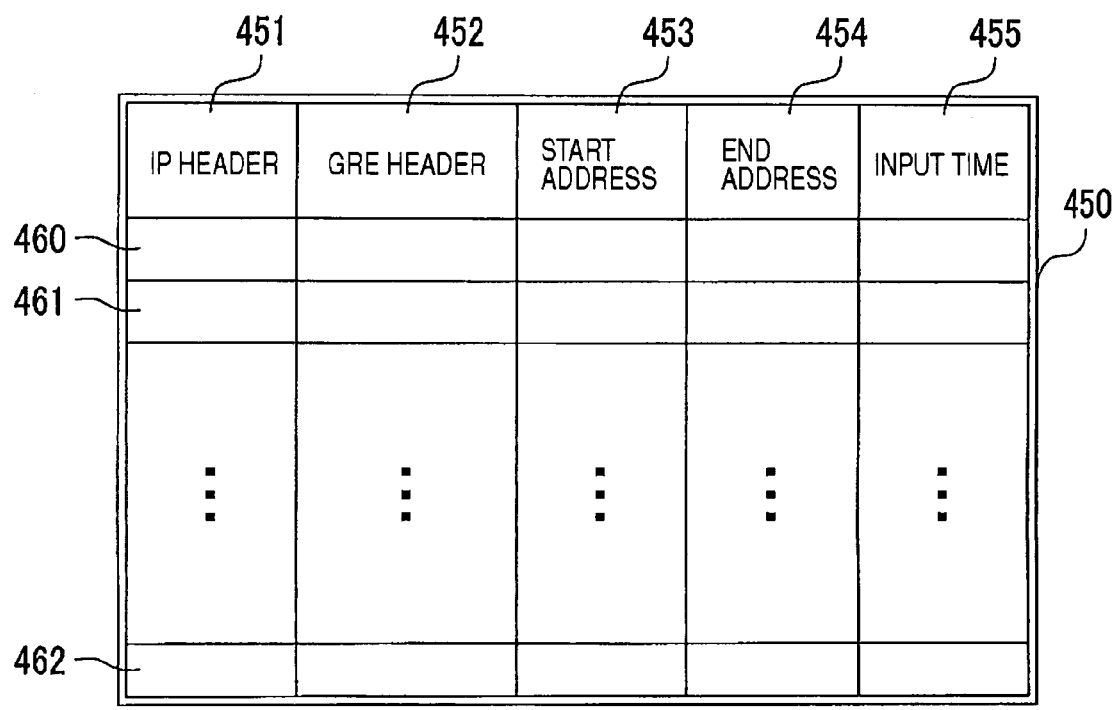
Figure 18:
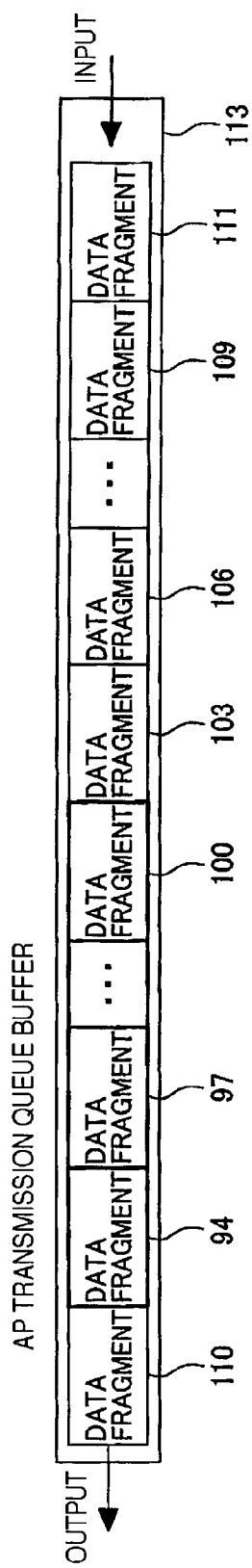
Figure 19:
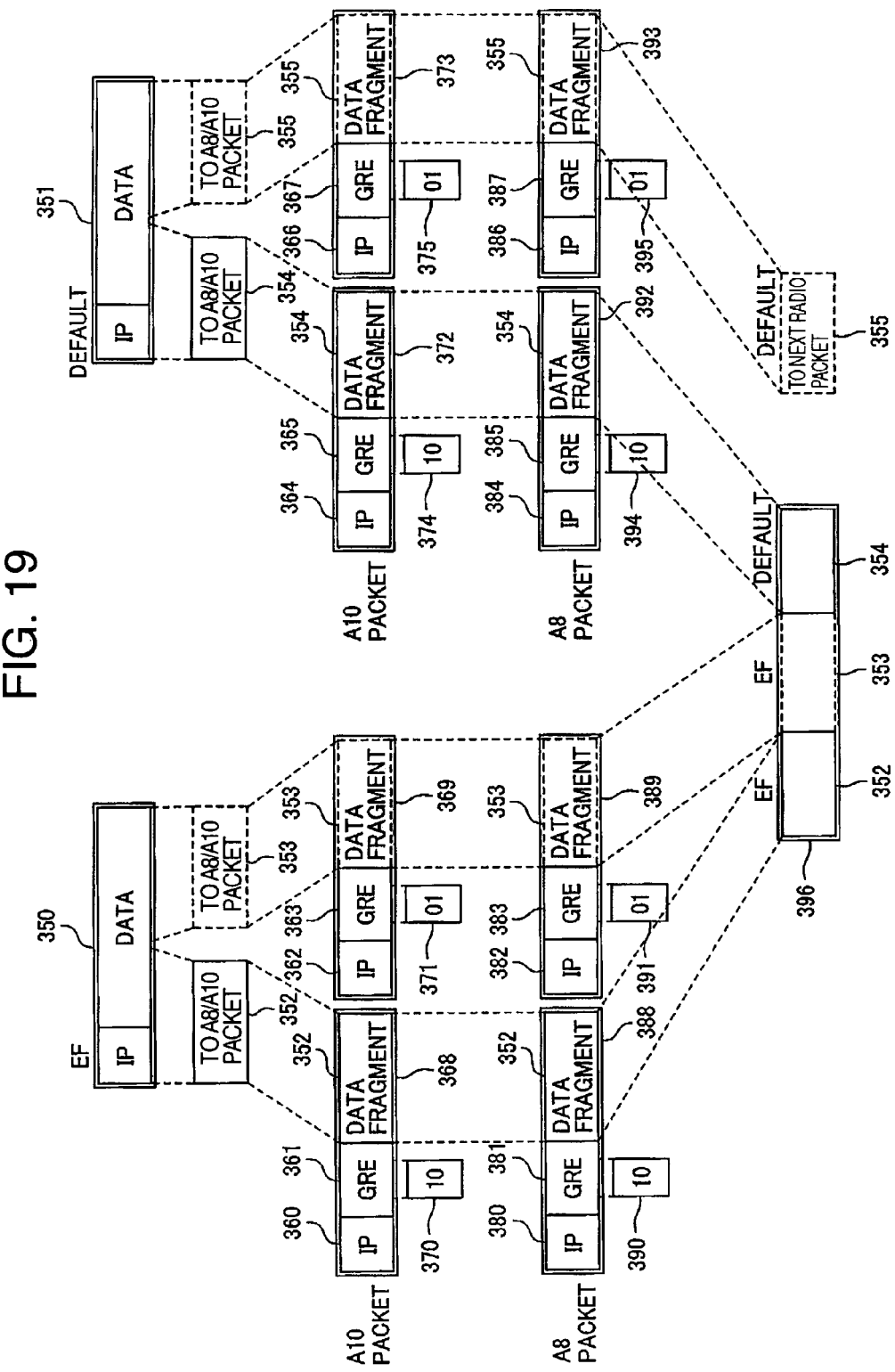
Figure 20:
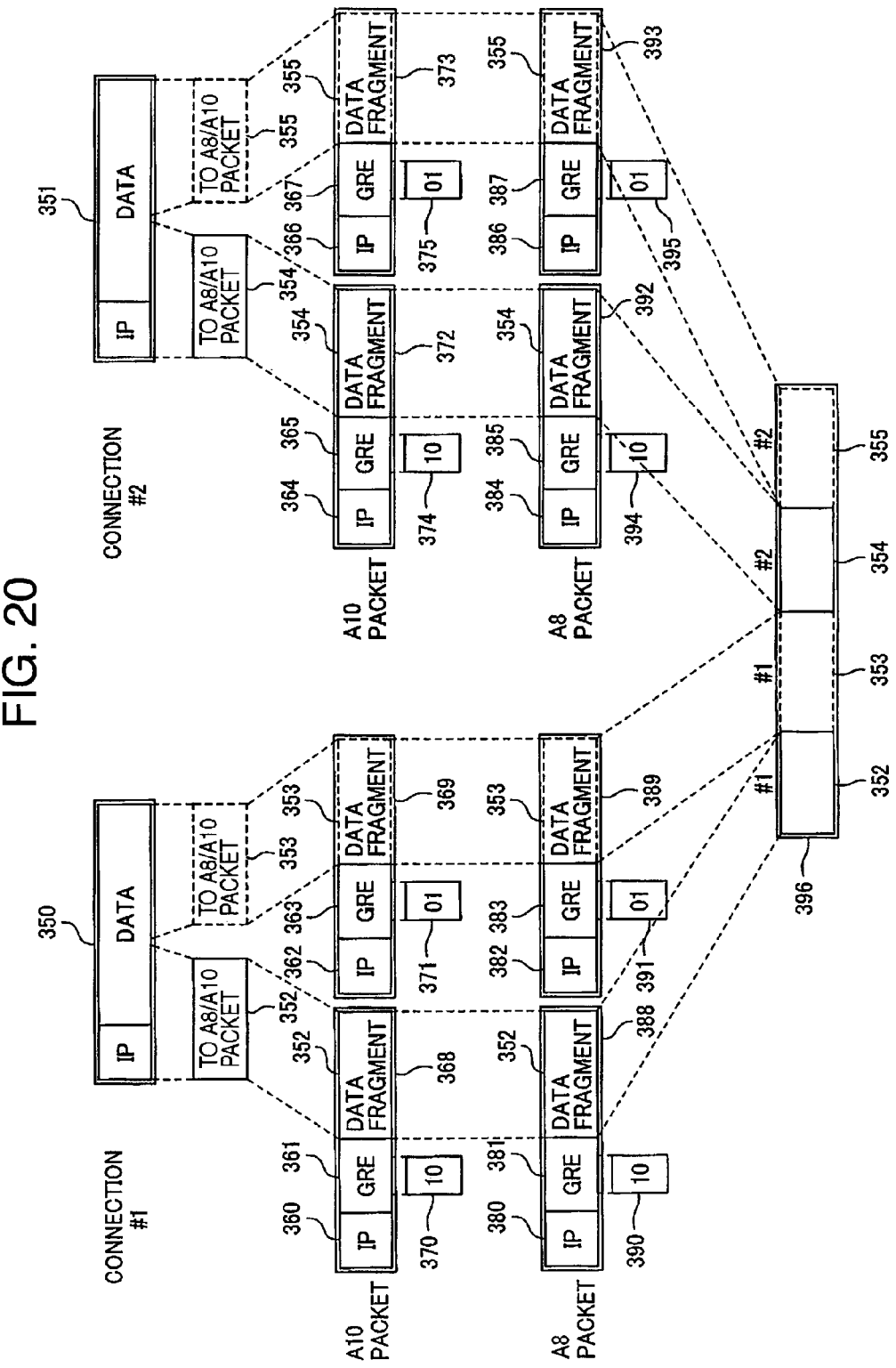
Figure 21:
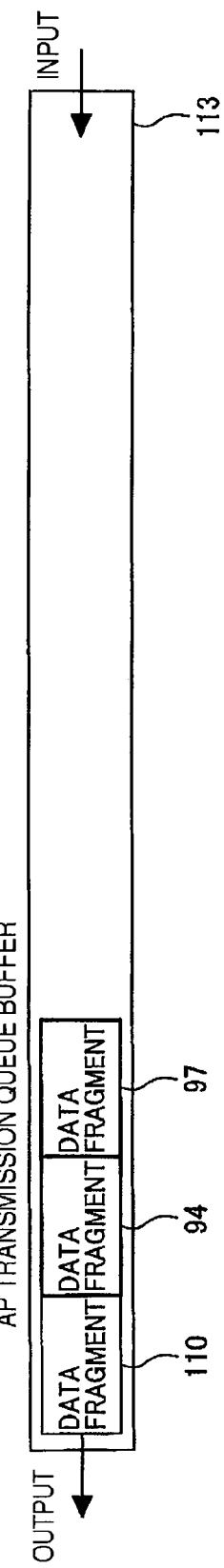
Figure 22:
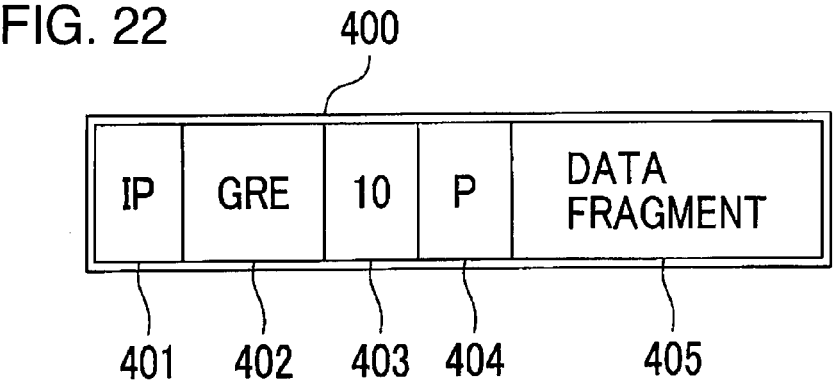
Figure 23:
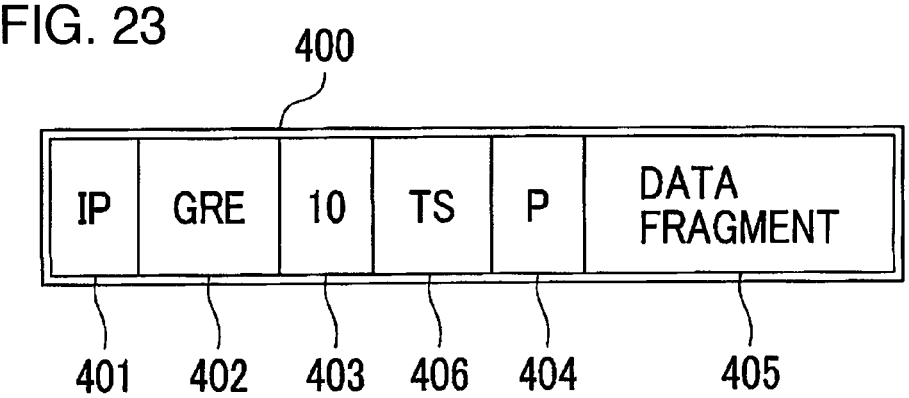
Figure 24:
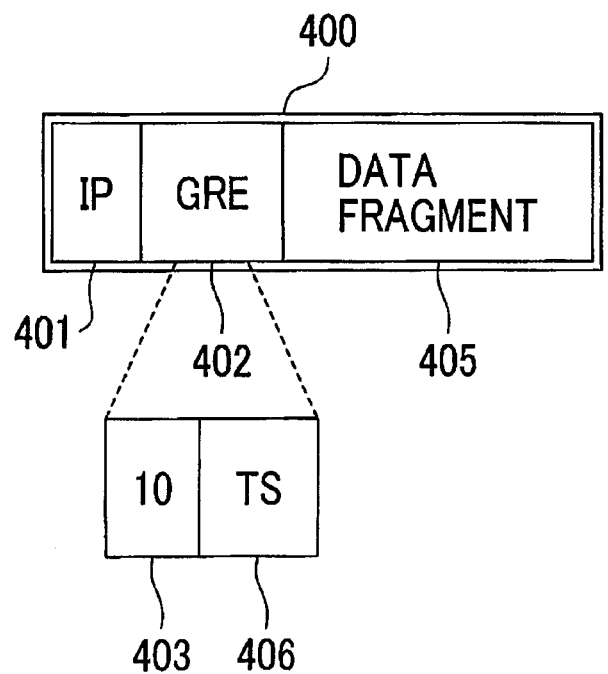
Figure 25:
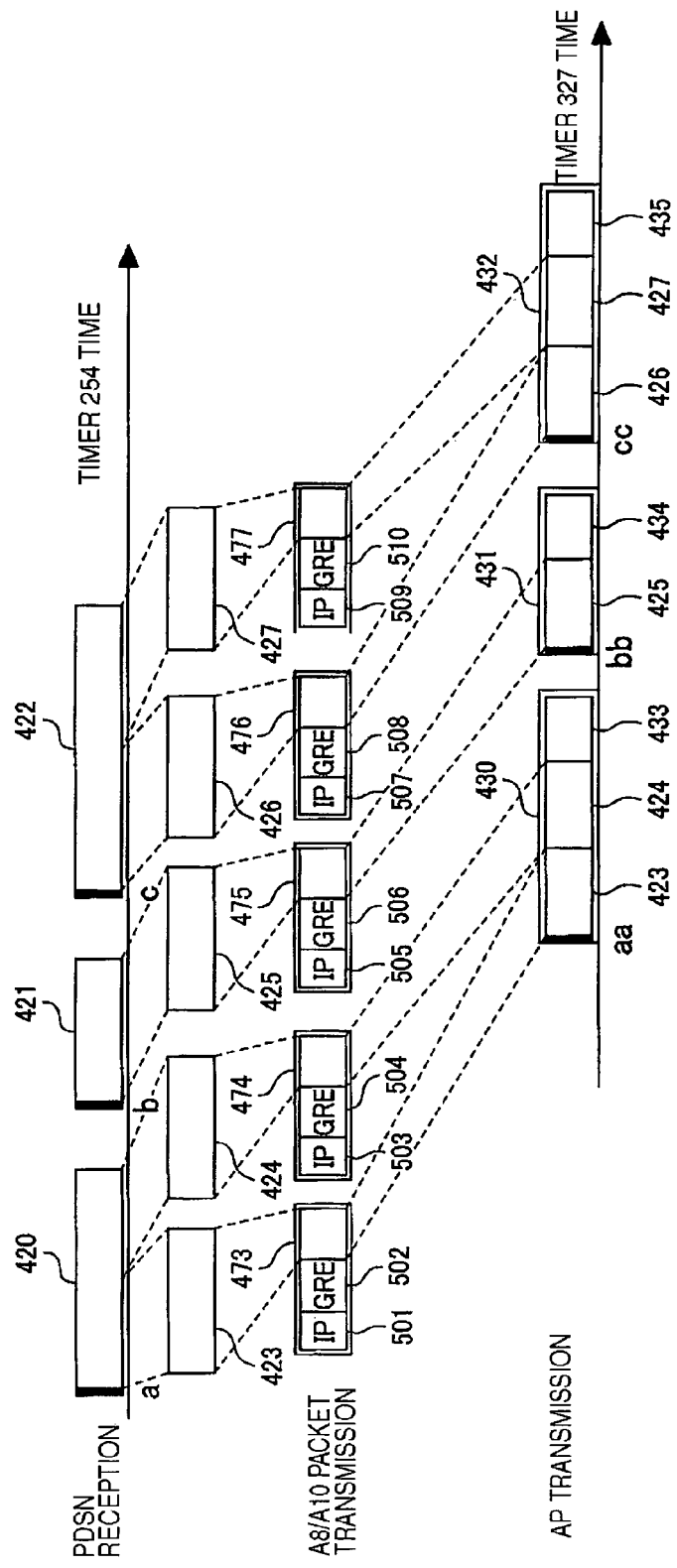
Figure 26:
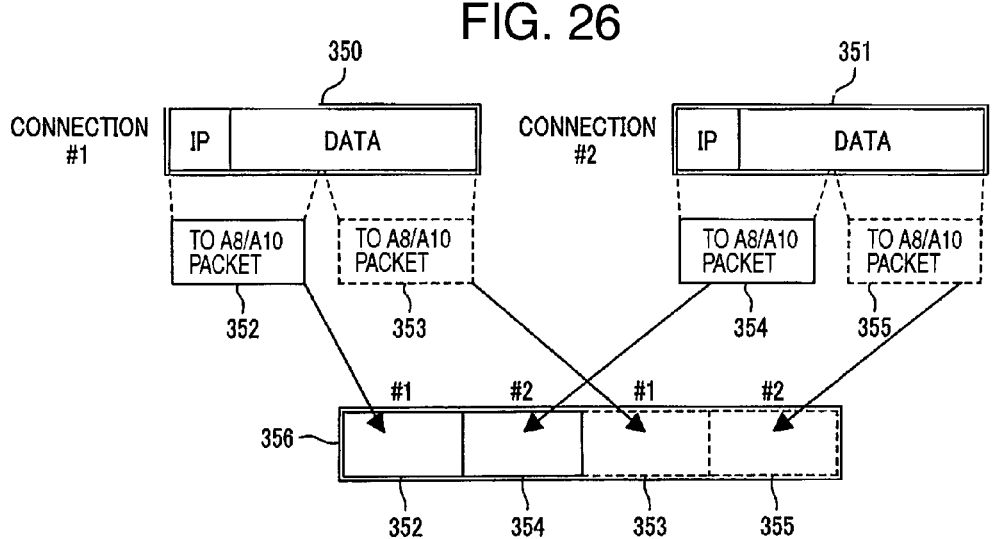
Figure 27:
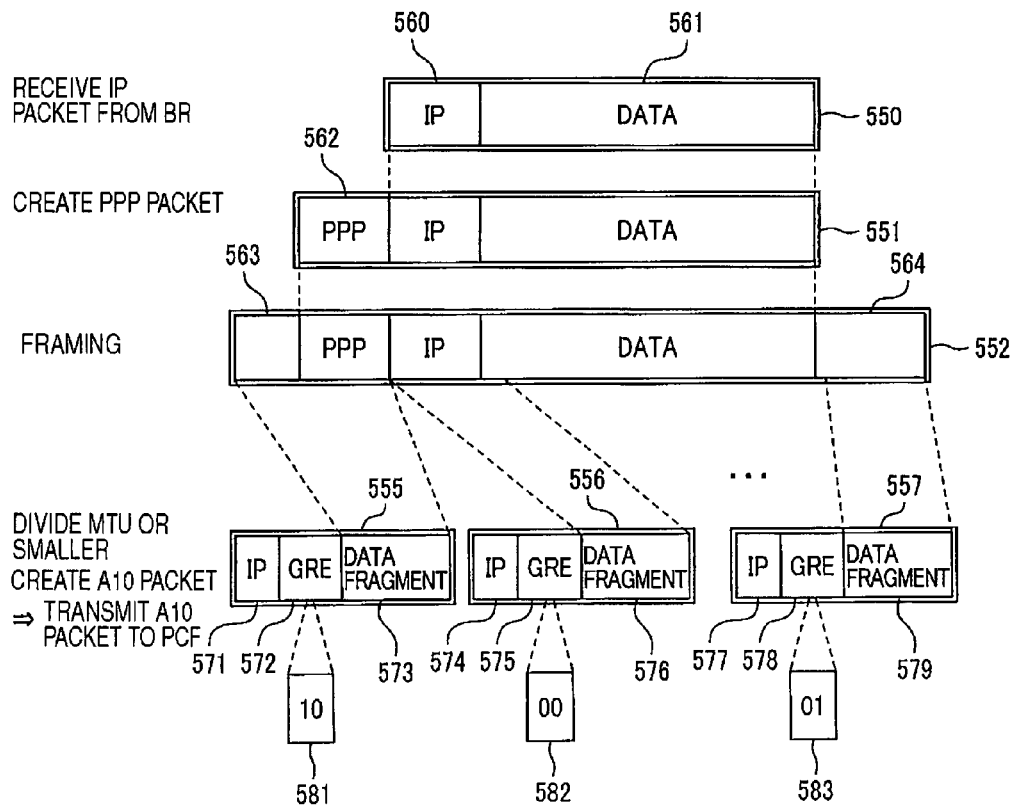
Figure 28:
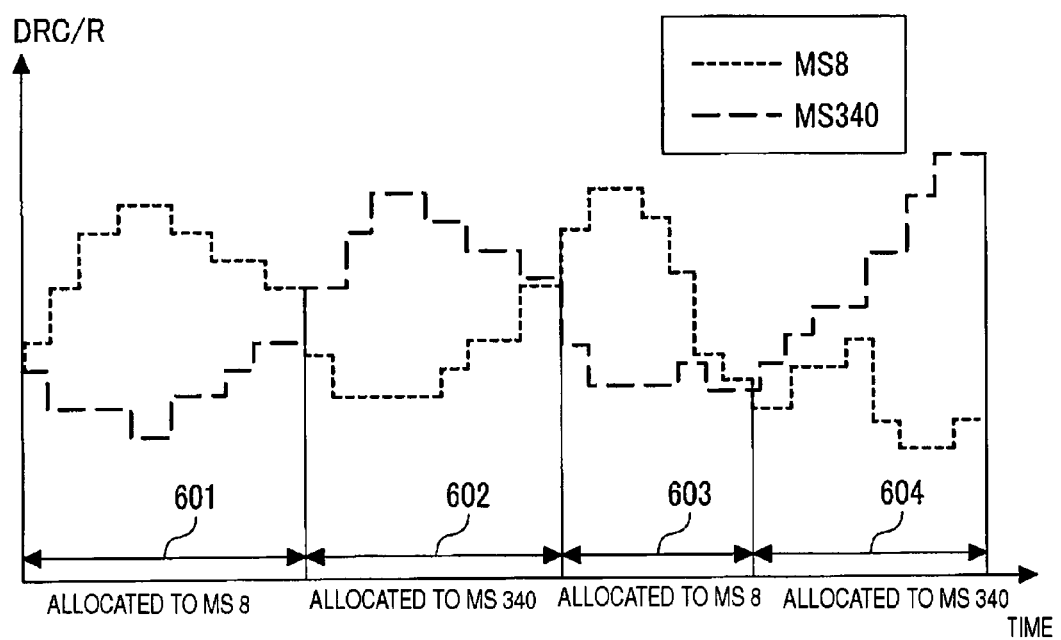
Figure 29:
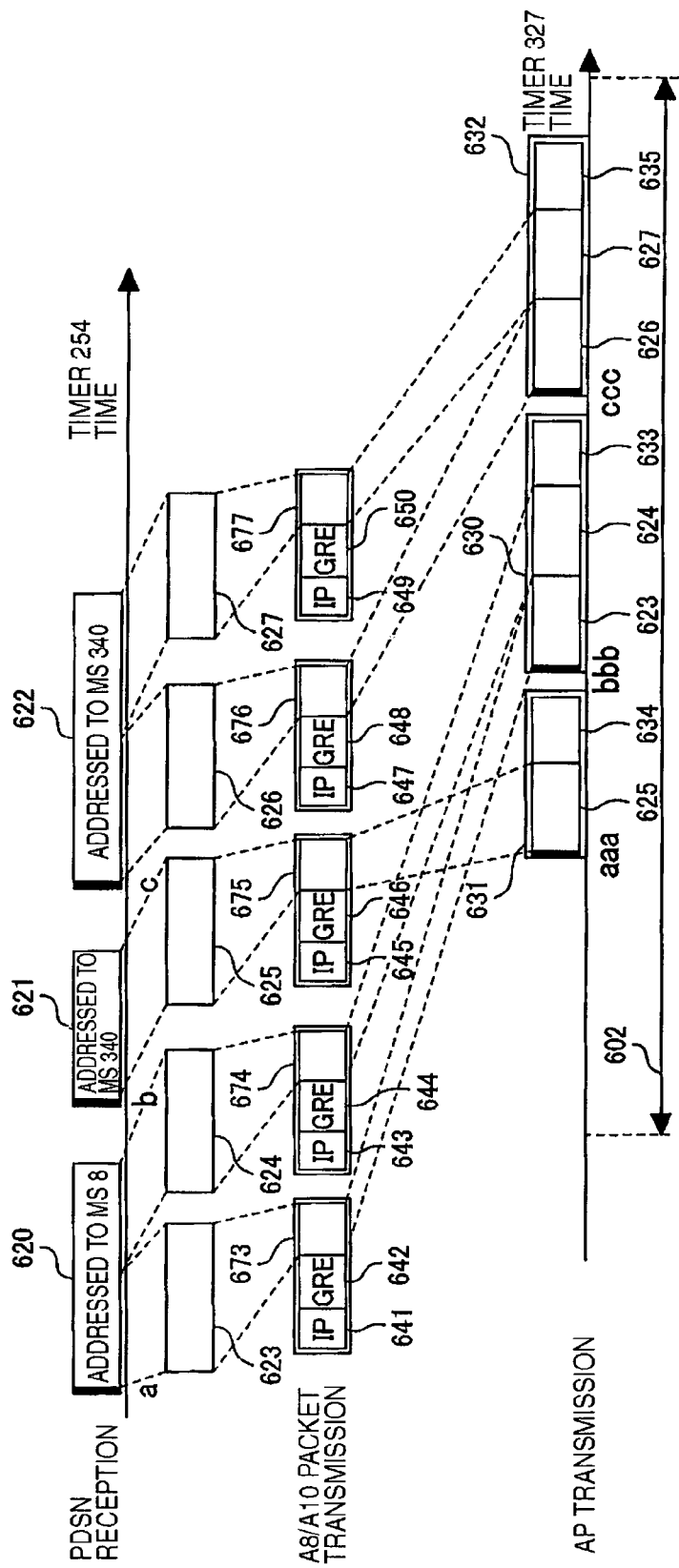
Figure 30:
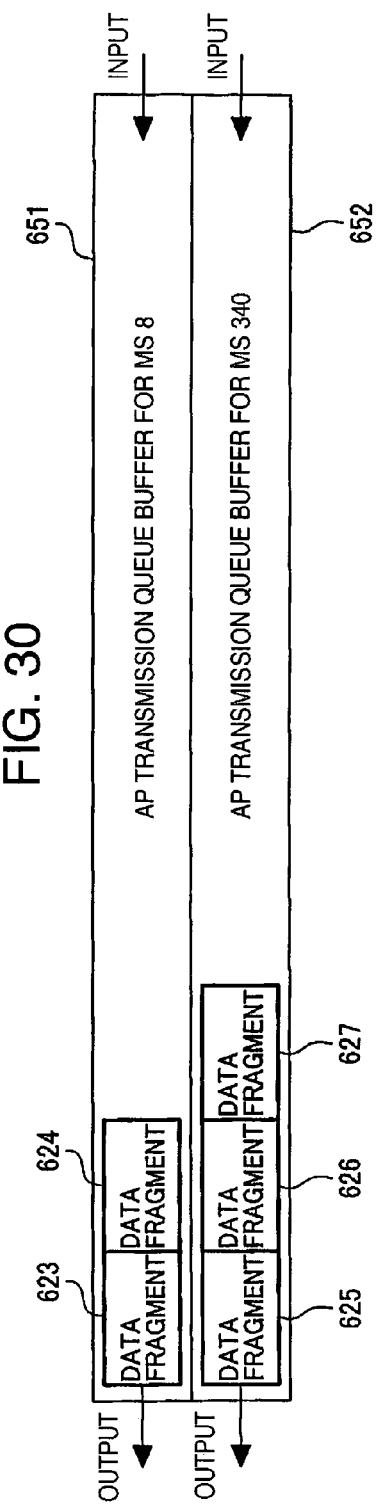
Figure 31:
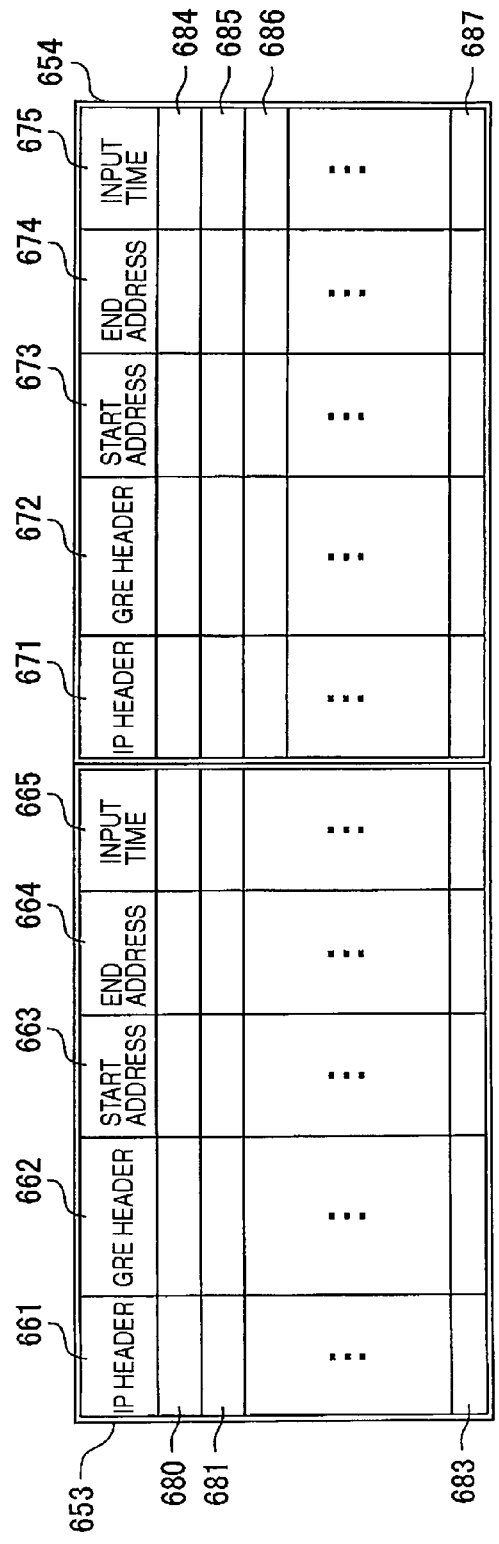

The invention claimed is:

1. A node device comprising:
a reception unit, for receiving a packet according to a first protocol;
a transmission unit, connected to an access point, for transmitting packets according to a second protocol, where the access point prepares a transmission packet based on the packets from the transmission unit; and
a controller which:
prepares a plurality of packets, each of the packets including one or more data fragments, by dividing a received packet,
adds, to each of the prepared packets which are related to different QoS classes, a concatenation flag as control information, that indicates whether each respective prepared packet includes a data fragment corresponding to a head or a tail of the received packet, and
transmits via the transmission unit, the plurality of prepared packets over different connections which are configured between the node device and the access point,
wherein the access point prepares a transmission packet comprising a plurality of data fragments having different QoS classes which are included in the plurality of the prepared packets transmitted over the different connections and the plurality of data fragments are arranged in an order that maintains the arrangement in the received packet.

2. A node device according to claim 1,
wherein the controller prepares a frame comprising the received packet and additional data in accordance with a framing protocol, and divides the frame to prepare the plurality of packets.

3. A node device according to claim 1, wherein the controller, which includes a timer for counting time and which employs the timer to measure a reception time for the received packet, transmits a first prepared packet by adding the reception time as control information to the first prepared packet.

4. A node device according to claim 1, wherein the first protocol is an IP protocol, and the second protocol is a RAN (radio access network) protocol.

5. A network system comprising:
a node device connected to a first network according to a first protocol; and
a packet transfer control device connected to the node device via a second network according to a second protocol;
wherein the node device is configured to:
receive a first packet having a first format according to the first protocol via the first network;
create a frame including the first packet and divide the frame to prepare a plurality of second packets each including one or more data fragments, the plurality of second packets having the first format according to the second protocol;
add, to each of the second packets, first control information which indicates whether each of the second packets includes a data fragment corresponding to a head or a tail of the first packet; and
transmit the second packets including the control information to the packet transfer control device over different connections;
wherein the packet transfer control device is configured to:
receive the second packets including the control information over the different connections;
create a plurality of third packets having a second format according to the second protocol based on the second packets and the first control information included in the second packets; and
control transmission of the third packets to an access point via the second network based on the first control information wherein the access point prepares a transmission packet comprising a plurality of data fragments having different QoS classes which are included in the plurality of the third packets transmitted over the different connections and the plurality of data fragments are arranged in an order that maintains the arrangement in the first packet.

6. The network system according to claim 5, the packet control device is further configured to:
add, to the third packet based on the first control information, a concatenation flag, as a second control information of the third packet, that indicates whether the third packet includes a data fragment corresponding to a head or a tail of the first packet according to the first protocol.

7. The network system according to claim 5, wherein the first protocol is an IP protocol, and the second protocol is a RAN protocol.

8. The network system according to claim 5, wherein the first protocol is an IP protocol, the second protocol is a RAN (radio access network) protocol, the first format is an A10 format, and the second format is an A8 format.

9. The network system according to claim 6, further comprising the access point which forms a plurality of connections with the packet transfer control device, wherein
the access point forms the transmission packet to be transmitted to a mobile station via wireless network based on the plurality of the third packets transmitted over the plurality of connections.

10. A transmission control method for transmitting information from a first network according to a first protocol to a second network according to a second protocol, comprising the steps of:
by a first communication device connected to the first network:
receiving a first packet having a first format according to the first protocol via the first network;
creating a frame including the first packet; and
dividing the frame to prepare a plurality of second packets each including one or more data fragments, the plurality of second packets having the first format according to the second protocol; and
adding, to each of the second packets, first control information which indicates whether each of the second packets includes a data fragment corresponding to a head or a tail of the first packet; and
transmitting the second packets including the control information to the packet transfer control device over different connections;
by a packet transfer control device connected to the second network:
receiving the second packets including the control information over the different connections;
creating a third packet having a second format according to the second protocol based on the second packets and the first control information included in the second packets; and
adding, to the third packet based on the first control information, a concatenation flag, as a second control information of the third packet, that indicates whether the third packet includes a data fragment corresponding to a head or a tail of the first packet according to the first protocol; and
transmitting the third packet to an access point via the second network based on the first control information wherein the access point prepares a transmission packet comprising a plurality of data fragments having different QoS classes which are included in a plurality of the third packets transmitted over the different connections and the plurality of data fragments are arranged in an order that maintains the arrangement in the first packet.

* * * * *